US006810214B2

(12) United States Patent
Chbat et al.

(10) Patent No.: US 6,810,214 B2
(45) Date of Patent: Oct. 26, 2004

(54) METHOD AND SYSTEM FOR REDUCING DEGRADATION OF OPTICAL SIGNAL TO NOISE RATIO

(75) Inventors: Michel W. Chbat, Allen, TX (US); Herve A. Fevrier, Richardson, TX (US); Pavle Gavrilovic, Allen, TX (US); Hyunchin Kim, Allen, TX (US); Andrej B. Puc, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 09/811,067

(22) Filed: Mar. 16, 2001

(65) Prior Publication Data
US 2002/0141008 A1 Oct. 3, 2002

(51) Int. Cl.[7] .................. H04B 10/00; H04B 10/12; H04J 14/02; H01S 3/00
(52) U.S. Cl. ............ 398/160; 398/92; 398/94; 398/97; 398/149; 398/157; 398/159; 398/173; 398/177; 359/337; 359/337.2; 359/349
(58) Field of Search ................ 359/174, 176, 359/177, 179, 337.1, 337.2, 341.41, 341.3, 341.42, 349, 337; 398/92, 94, 97, 149, 157, 159, 160, 173, 177

(56) References Cited

U.S. PATENT DOCUMENTS

| 3,772,528 | A | 11/1973 | Anderson | 307/88.3 |
|---|---|---|---|---|
| 4,616,898 | A | 10/1986 | Hicks, Jr. | 350/96.15 |
| 4,700,339 | A | 10/1987 | Gordon et al. | 370/3 |
| 4,932,739 | A | 6/1990 | Islam | 350/96.15 |
| 4,995,690 | A | 2/1991 | Islam | 350/96.15 |
| 5,020,050 | A | 5/1991 | Islam | 370/4 |
| 5,060,302 | A | 10/1991 | Grimes | 359/135 |

(List continued on next page.)

FOREIGN PATENT DOCUMENTS

| EP | 0 829 980 A2 | 3/1998 | H04J/14/02 |
|---|---|---|---|
| EP | 0 903 876 B1 | 3/1999 | H04B/10/17 |
| EP | 0 903 876 A1 | 3/1999 | H04B/10/17 |
| EP | 0 903 877 A2 | 3/1999 | H04B/10/18 |
| EP | 0 911 926 A1 | 4/1999 | H01S/3/10 |

(List continued on next page.)

OTHER PUBLICATIONS

Chraplyvy et al., "Equalization in Amplified WDM Lightwave Transmission Systems," IEEE Photonics Technology Letters, vol. 4, No. 8, pp. 920–922, Aug. 1992.

Hansen et al., "Repeaterless transmission experiment employing dispersion," 21st European Conference on Optical Communication, vol. 2, 1 page, Sep. 17–21, 1995.

Yamada et al., "A Low–Noise and Gain–Flattened Amplifier Composed of a Silica–Based and a Fluoride–Based Er3+ Doped Fiber Amplifier in a Cascade Configuration," IEEE Photonics Letters, vol. 8, No. 5, pp. 620–622, May 1996.

(List continued on next page.)

Primary Examiner—M. R. Sedighian
(74) Attorney, Agent, or Firm—Baker Botts L.L.P.

(57) ABSTRACT

In one aspect of the invention, a system operable to reduce degradation of an optical signal to noise ratio where signals having multiple wavelengths are communicated over a common optical link includes an amplifier assembly operable to introduce to a lower communication band a first gain and to introduce to a higher communication band a second gain that is different from the first gain. In addition, the system is operable to introduce a variable gain tilt into at least one of the communication bands. The different gains introduced to the higher and lower bands and the variable gain tilt introduced into at least one of the bands result in a reduction of a degradation of optical signal to noise ratio that could otherwise be caused by wavelength dependent attenuation when the communication bands are combined and communicated over an optical link.

109 Claims, 6 Drawing Sheets

U.S. PATENT DOCUMENTS

| | | | |
|---|---|---|---|
| 5,078,464 A | 1/1992 | Islam | 385/122 |
| 5,101,456 A | 3/1992 | Islam | 385/27 |
| 5,115,488 A | 5/1992 | Islam et al. | 385/129 |
| 5,117,196 A | 5/1992 | Epworth et al. | 359/333 |
| 5,140,456 A | 8/1992 | Huber | 359/341 |
| 5,224,194 A | 6/1993 | Islam | 385/122 |
| 5,225,922 A | 7/1993 | Chraplyvy et al. | 359/124 |
| 5,369,519 A | 11/1994 | Islam | 359/173 |
| 5,485,536 A | 1/1996 | Islam | 385/31 |
| 5,557,442 A | 9/1996 | Huber | 359/179 |
| 5,559,920 A | 9/1996 | Chraplyvy et al. | 385/123 |
| 5,623,508 A | 4/1997 | Grubb et al. | 372/3 |
| 5,633,750 A | 5/1997 | Nogiwa et al. | 359/341 |
| 5,664,036 A | 9/1997 | Islam | 385/31 |
| 5,673,280 A | 9/1997 | Grubb et al. | 372/3 |
| 5,778,014 A | 7/1998 | Islam | 372/6 |
| 5,790,289 A | 8/1998 | Taga et al. | 359/124 |
| 5,796,909 A | 8/1998 | Islam | 385/147 |
| 5,801,860 A | 9/1998 | Yoneyama | 359/124 |
| 5,808,762 A * | 9/1998 | Vanoli et al. | 359/124 |
| 5,815,518 A | 9/1998 | Reed et al. | 372/6 |
| 5,852,510 A | 12/1998 | Meli et al. | 359/341 |
| 5,887,093 A | 3/1999 | Hansen et al. | 385/27 |
| 5,905,838 A | 5/1999 | Judy et al. | 385/123 |
| 5,920,423 A | 7/1999 | Grubb et al. | 359/341 |
| 5,959,750 A | 9/1999 | Eskildsen et al. | 359/134 |
| 5,959,766 A | 9/1999 | Otterbach et al. | 359/337 |
| 5,978,130 A | 11/1999 | Fee et al. | 359/341 |
| 5,995,275 A | 11/1999 | Sugaya | 359/341 |
| 6,008,933 A | 12/1999 | Grubb et al. | 359/341 |
| 6,040,933 A | 3/2000 | Khaleghi et al. | 359/124 |
| 6,043,927 A | 3/2000 | Islam | 359/332 |
| 6,049,413 A | 4/2000 | Taylor et al. | 359/337 |
| 6,049,417 A * | 4/2000 | Srivastava et al. | 359/341 |
| 6,052,393 A | 4/2000 | Islam | 372/6 |
| 6,055,092 A * | 4/2000 | Sugaya et al. | 359/337 |
| 6,067,177 A | 5/2000 | Kanazawa | 359/124 |
| 6,072,601 A | 6/2000 | Toyohara | 358/484 |
| 6,081,366 A | 6/2000 | Kidorf et al. | 359/341 |
| 6,088,152 A * | 7/2000 | Berger et al. | 359/334 |
| 6,094,296 A | 7/2000 | Kosaka | 359/341 |
| 6,101,024 A | 8/2000 | Islam et al. | 359/334 |
| 6,104,848 A | 8/2000 | Toyohara et al. | 385/24 |
| 6,115,157 A | 9/2000 | Barnard et al. | 359/124 |
| 6,115,174 A | 9/2000 | Grubb et al. | 359/334 |
| 6,134,034 A | 10/2000 | Terahara | 359/124 |
| 6,147,794 A | 11/2000 | Stentz | 359/334 |
| 6,151,160 A | 11/2000 | Ma et al. | 359/341 |
| 6,163,636 A | 12/2000 | Stentz et al. | 385/24 |
| 6,172,803 B1 | 1/2001 | Masuda et al. | 359/341 |
| 6,181,464 B1 | 1/2001 | Kidorf et al. | 359/334 |
| 6,185,022 B1 | 2/2001 | Harasawa | 359/124 |
| 6,219,162 B1 | 4/2001 | Barnard et al. | 359/124 |
| 6,219,176 B1 | 4/2001 | Terahara | 359/341 |
| 6,229,937 B1 | 5/2001 | Nolan et al. | 385/24 |
| 6,239,902 B1 | 5/2001 | Islam et al. | 359/334 |
| 6,239,903 B1 | 5/2001 | Islam et al. | 359/337 |
| 6,263,139 B1 | 7/2001 | Kawakami et al. | 385/123 |
| 6,271,945 B1 | 8/2001 | Terahara | 359/124 |
| 6,282,002 B1 | 8/2001 | Grubb et al. | 359/160 |
| 6,307,668 B1 * | 10/2001 | Bastien et al. | 359/337.1 |
| 6,310,716 B1 | 10/2001 | Evans et al. | 359/334 |
| 6,320,884 B1 | 11/2001 | Kerfoot, III et al. | 372/3 |
| 6,335,820 B1 | 1/2002 | Islam | 359/334 |
| 6,341,034 B1 | 1/2002 | Sun et al. | 359/341.41 |
| 6,344,922 B1 | 2/2002 | Grubb et al. | 359/334 |
| 6,356,383 B1 | 3/2002 | Cornwell, Jr. et al. | 359/334 |
| 6,356,384 B1 * | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,388,801 B1 | 5/2002 | Sugaya et al. | 359/334 |
| 6,396,625 B1 * | 5/2002 | Nakaji | 359/341.41 |
| 6,404,523 B1 | 6/2002 | Morikawa et al. | 359/124 |
| 6,404,964 B1 | 6/2002 | Bhagavatula et al. | 385/123 |
| 6,414,786 B1 | 7/2002 | Foursa | 359/334 |
| 6,417,959 B1 | 7/2002 | Bolshtyansky et al. | 359/324 |
| 6,433,903 B1 * | 8/2002 | Barry et al. | 359/124 |
| 6,437,906 B1 * | 8/2002 | Di Pasquale et al. | 359/337.2 |
| 2001/0014194 A1 | 8/2001 | Sasoka et al. | 385/15 |
| 2001/0050802 A1 | 12/2001 | Namiki et al. | 359/337.11 |
| 2002/0001123 A1 | 1/2002 | Miyakawa et al. | 359/334 |
| 2002/0048062 A1 | 4/2002 | Sakamoto et al. | 359/124 |
| 2002/0060821 A1 | 5/2002 | Manna et al. | 359/124 |

FOREIGN PATENT DOCUMENTS

| | | | |
|---|---|---|---|
| EP | 0 936 761 A1 | 8/1999 | H04B/10/18 |
| EP | 0 959 578 A2 | 11/1999 | H04J/14/02 |
| EP | 1 054 489 A2 | 11/2000 | H01S/3/067 |
| EP | 1 069 712 A2 | 1/2001 | H04B/10/17 |
| EP | 1 180 860 A1 | 2/2001 | H04B/10/17 |
| WO | 98/20587 | 5/1998 | H01S/3/30 |
| WO | 98/36479 | 8/1998 | H01S/3/10 |
| WO | 98/42088 | 9/1998 | H04B/10/17 |
| WO | 99/43117 | 8/1999 | H04J/14/00 |
| WO | 99/66607 | 12/1999 | |
| WO | 00/73826 A2 | 7/2000 | G02B/6/00 |
| WO | 00/49721 | 8/2000 | |
| WO | 00/72479 | 11/2000 | H04B/10/08 |

OTHER PUBLICATIONS

Liaw et al., "Passive Gain–Equalized Wide–Band Erbium-Doped Fiber Amplifier Using Samarium–Doped Fiber," IEEE Photonics Technology Letters, vol. 8, No. 7, pp. 879–881, Jul. 1996.

White et al.; "Optical Fiber Components and Devices," Optical Fiber Telecommunications, Ch. 7, pp. 267–319, 1997.

Zyskind et al., "Erbium–Doped Fiber Amplifiers for Optical Communications," Optical Fiber Telecommunications, Ch. 2., pp. 13–69, 1997.

Agrawal, "Fiber–Optic Communication Systems," Second Edition, Basic Concepts, 2nd Ed. John Wiley & Sons, pp. 365–366 plus title page and copyright page, 1997.

Masuda et al., "Ultra–wideband optical amplification with 3dB bandwidth of 65 nm using a gain–equalised two–stage erbium–doped fibre amplifier and Raman amplification," Electronics Letters, vol. 33, No. 9, pp. 73–78, Feb. 24, 1997.

Tonguz et al., "Gain Equalization of EDFA Cascades," Journal of Lightwave Technology, vol. 15, No. 10, pp. 1832–1841, Oct. 1997.

Wysocki et al., "Broad–Band Erbium–Doped Fiber Amplifier Flattened Beyond 40 nm Using Long–Period Grating Filter," IEEE Photonics Technology Letters, vol. 9, No. 10, pp. 1343–1345, Oct. 10, 1997.

Sun et al., "80nm ultra–wideband erbium–doped silica fibre amplifier," Electronics Letters vol. 33, No. 23, pp. 1965–1967, Nov. 06, 1997.

Rotwitt et al., "Distributed Raman Amplifiers for Long Haul Transmission Systems," IEEE, pp. 251–252, 1998.

Kawai et al., "Ultrawide, 75nm 3–dB gain–band optical amplifier utilizing erbium–doped fluoride fiber and Raman fiber," Tuesday Afternoon, OFC Technical Digest, TuG3, pp. 32–33, 1998.

Hansen et al., "Rayleigh Scattering Limitations in Distributed Raman Pre–Amplifiers," IEEE Photonics Technology Letters, vol. 10, No. 1, pp. 159–161, Jan. 1998.

Hansen et al.; "Loss compensation in dispersion compensating fiber modules by Raman amplification," Optical Fiber Conference OFC'98, Technical Digest TuD1, pp. 20–21, Feb. 1998.

Masuda et al., "Ultrawide 75–nm 3–dB Gain–Band Optical Amplification with Erbium–Doped Fluoride Fiber Amplifiers and Distributed Raman Amplifiers," IEEE Photonics Technology Letters, vol. 10, No. 4, pp. 516–518, Apr. 1998.

Dianov et al., "Highly efficient 1.3$\mu$m Raman fibre amplifier," Electronics Letters, vol. 34, No. 7, Apr. 02, 1998.

Ma et al., "240–km Repeater Spacing in a 5280–km WDM System Experiment Using 8×2.5 Gb/s NRZ Transmission," IEEE Photonics Technology Letters, vol. 10, No. 6, pp. 893–895, Jun. 1998.

Forghieri et al., "Simple Model of Optical Amplifier Chains to Evaluate Penalties in WDM Systems," Journal of Lightwave Technology, vol. 16, No. 9, pp. 1570–1576, Sep. 1998.

Chernikov et al., "Broadband Silica Fibre Raman Amplifiers at 1.3 $\mu$m and 1.5.$\mu$m ," ECOC, pp. 49–50, Sep. 20–24, 1998.

Letellier et al., "Access to Transmission Performance Margins Through Pre–emphasis Adjustment in WDM Systems," ECOC , pp. 275–276.

Becker et al., "Erbium Doped Fiber Amplifiers Fundamentals and Technology," Academic Press, pp. 55–60 plus title and copyright page, 1999.

Becker et al., "Erbium Doped Fiber Amplifiers Fundamentals and Technology," Academic Press, pp. 55–60 plus title and copyright page, 1999.

Chernikov et al., "Broadband Raman amplifiers in the spectral range of 1480–1620 nm," OFC/IOOC Technical Digest, vol. 2, pp. 117–119, Feb. 21–26, 1999.

Kidorf et al., Pump Interactions in a 100–nm Bandwidth Raman Amplifier, IEEE Photonics Technology Letters, vol. 11, No. 5, pp. 530–532, May, 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Kawai et al. "Wide–Bandwidth and Long–Distance WDM Transmission Using Highly Gain–Flattened Hybrid Amplifier," IEEE Photonics Technology Letters, vol. 11, No. 7, pp. 886–888, Jul. 1999.

Lewis et al., "Gain and saturation characteristics of dual-wavelengh–pumped silica–fibre Raman amplifiers," Electronics Letters, vol. 35, No. 14, pp. 1178–1179, Jul. 08, 1999.

Suzuki et al., "50 GHz spaced, 32×10 Gbit/s dense WDM transmission in zero–dispersion region over 640km of dispersion–shifted fibre with multiwavelength distributed Raman amplification," Electronics Letters, vol. 35, No. 14, pp. 1175–1176, Jul. 08, 1999.

Emori et al., "100nm bandwidth flat–gain Raman amplifiers pumped and gain–equalised by 12–wavelength–channel WDM laser diode unit," Electronics Letters, vol. 35, No. 16, pp. 1355–1356, Aug. 05, 1999.

Yun et al., "Dynamic Erbium–Doped Fiber Amplifier Based on Active Gain Flattening with Fiber Acoustooptic Tunable Filters," IEEE Photonics Technology Letters, vol. 11, No. 10, pp. 1229–1231, Oct. 1999.

Manna et al., "Modeling of Penalties on Chains of Optical Amplifiers with Equalizing Filters," Journal of Lightwave Technology, vol. 18, No. 3, pp. 295–300, Mar. 2000.

Nielsen et al., "3.28 Tb/s (82/spl times 40 Gb/s) transmission over 3/spl times 100 km nonzero–dispersion fiber using dual C– and L–band hybrid Raman/erbium–doped inline amplifiers," OFCC 2000, pp. 236–238 plus internet title page, Mar. 7–10, 2000.

Seo et al., "Compensation of Raman–Induced Crosstalk Using a Lumped Germanosilicate Fiber Raman Amplifier in the 1.571–1.591–$\mu$m Region", IEEE Photonics Technology Letters, vol. 13, No. 1, pp. 28–30, Jan. 2001.

Seo et al., "Simultaneous Amplification and Channel Equalizatio Using Raman Amplifier for 30 Channels in 1.3–$\mu$m Band," Journal of Lightwave Technology, vol. 19, No. 3, pp. 391–397, Mar. 2001.

Chen et al., "Transient effects in saturated Raman amplifiers," Electronics Letters, vol. 37, No. 6, 2 pgs., Mar. 15, 2001.

Fludger et al., "Fundamental Noise Limits in Broadband Raman Amplifiers," OFC, pp. MA5/1–MA5/3, 2001.

Menif et al., "Application of Preemphasis to Achieve Flat Output OSNR in Time–Varying Channels in Cascaded EDFAs Without Equalization," Journal of Lightwave Technology, vol. 19, No. 10, pp. 1440–1452, Oct. 2001.

Murakami et al., "WDM Upgrading of an Installed Submarine Optical Amplifier System," Journal of Lightwave Technology, vol. 19, No. 11, pp. 1665–1674, Nov. 2001.

Koch et al., "Broadband gain flattened Raman Amplifier to extend operation in the third telecommunication window," FF3–1–3, pp. 103–105.

Emori et al., "Cost–effective depolarized diode pump unit designed for C–band flat–gain Raman Amplifiers to control EDFA gain profile," FF4–1–3, pp. 106–108.

Masuda et al., "76–nm 3–dB gain–band hybrid fiber amplifier without gain–equalizer," (Submitted to Post–Deadline Paper OAA'98), pp. PD7–1–PD7–5.

Srivastava et al., "High–speed WDM Transmission in All-Wave™ Fiber in Both the 1.4–$\mu$m and 1.55–$\mu$m Bands," paper PD–2–5, Vail, CO.

Walker, "Status and Challenges of Optical Fiber Amplifiers and Lasers," paper MB–1–3, pp. 12–14.

Emori et al., "Less than 4.7 dB Noise Figure Broadband In–line EDFA with A Raman Amplified–1300 ps/nm DCF Pumped by Multi–channel WDM Laser Diodes," paper PD3–1–5.

Rottwitt et al., "A 92 nm Bandwidth Raman Amplifier," paper PD–6, pp. 1–4.

Nissov et al., "100 Gb/s (10×10Gb/s) WDM Transmission Over 7200 km Using Distributed Raman Amplification," pp. 9–12.

Yariv, "Optical Electronics in Modern Communications," Detection of Optical Radiation, Ch. 11, pp. 412–473.

Scheerer et al., "SRS crosstalk in preemphasized WDM Systems," pp. WM28–1/293–WM28–3/295.

Pending patent application; WO 99/66607; entitled "Dispersion Compensating and Amplifying Optical Element, Method for Minimizing Gain Tilt, and Apparatus for Minimizing Non–Linear Interaction between Band Pumps," by Mohammed N. Islam et al, Filed Jun. 16, 1999.

Pending patent application; USSN 09/765,972; entitled "S+ Band Nonlinear Polarization Amplifiers," by Mohammed N. Islam, Filed Jan. 19, 2001.

Pending patent application; USSN 09/766,489; entitled "Nonlinear Polarization Amplifiers in Nonzero Dispersion Shifted Fiber," by Mohammed N. Islam, Filed Jan. 19, 2001.

Pending patent application, USSN 09/768,367, entitled "All Band Amplifier," by Mohammed N. Islam, Filed Jan. 22, 2001.

Pending patent application; USSN 09/800,085; entitled "Dispersion Compensating Nonlinear Polarization Amplifier," by Mohammed N. Islam, Filed Mar. 05, 2001.

Pending patent application; USSN 09/811,103; entitled "System and Method for Wide Band Raman Amplification," by Mohammed N. Islam et al, Filed Mar. 16, 2001.

Pending patent application; USSN 09/916,454; entitled "System and Method for Controlling Noise Figure," by Mohammed N. Islam et al, Filed Jul. 27, 2001.

Pending patent application; USSN 09/971,436; entitled "High Reliability Optical Amplification," by Mohammed N. Islam et al, Filed Oct. 05, 2001.

Pending patent application; USSN 10/003,199; entitled "Broadband Amplifier and Communication System," by Mohammed N. Islam, Filed Oct. 30, 2001.

Pending patent application; USSN 10/007,643; entitled "Multi–Stage Optical Amplifier and Broadband Communication System," by Mohammed Islam, Filed Nov. 06, 2001.

Pending patent application; USSN 10/005,472; entitled "Multi–Stage Optical Amplifier and Broadband Communication System," by Mohammed Islam, Filed Nov. 06, 2001.

Pending patent application; USSN 09/990,142; entitled "Broadband Amplifier and Communication System," by Mohammed N. Islam, Filed Nov. 20, 2001.

Pending patent application; USSN 10/014,839; entitled "Multi–Stage Optical Amplifier and Broadband Communication System," by Mohammed N. Islam, Filed Dec. 10, 2001.

Pending patent application; USSN 10/028,576; entitled "Optical Amplification Using Launched Signal Powers Selected as a Function of a Noise Figure", pp. 1–77, by Mohammed N. Islam et al, Filed Dec. 20, 2001.

Pending patent application; USSN 10/100,591; entitled "System and Method for Managing System Margin," by Mohammed N. Islam et al, Filed Mar. 15, 2002.

Pending patent application; USSN 10/100,587; entitled "Fiber Optic Transmission System with Low Cost Transmitter Compensation," by Mohammed N. Islam, Filed Mar. 15, 2002.

Pending patent application; USSN 10/100,700; entitled "Rack System for an End Terminal in an Optical Communication Network," by Mohammed N. Islam et al, Filed Mar. 15, 2002.

Pending patent application; USSN 10/116,487; entitled "Fiber Optic Transmission System for a Metropolitan Area Network," by Mohammed N. Islam, Filed Apr. 03, 2002.

Pending patent application; USSN 10/188,158; entitled "Gain Control in Nonlinear Fiber Amplifier Stages," by Mohammed N. Islam, Filed Jul. 01, 2002.

Pending patent application; USSN 10/188,007; entitled "Multiple Wavelength Pumping of Raman Amplifier Stages," by Mohammed N. Islam, Filed Jul. 01, 2002.

Pending patent application; USSN 10/211,209; entitled "Active Gain Equalization," by Mohammed N. Islam et al, Filed Aug. 02, 2002.

PCT International Search Report Form PCT/ISA/210, International Application No. PCTUS02/07896, Jul. 15, 2002.

Hiroji Masuda and Shingo Kawal, Ultra Wide–Band Raman Amplification With A Total Gain–Bandwidth of 132 nm Of Two Gain–Bands Around 1.5 $\mu$m, ECOC '99, Nice, France, pp. II–146–II–147, Sep. 26–30, 1999.

Sugizaki, et al., Slope Compensating DCF for S–band Raman Amplifier, OSA TOPS vol. 60, Optical Amplifiers and Their Applications, Nigel Jolley, John D. Minelly, and Yoshiaki Nakano, eds., 2001 Optical Society of America, pp. 49–53, 2001.

Vasilyev, et al., Pump intensity noise and ASE spectrum of Raman amplification in non–zero dispersion–shifted fibers, reprinted from the Optical Amplifiers and Their Applications Conference, 2001 Technical Digest, 2001 Optical Society of America, pp. 57–59, 2001.

* cited by examiner

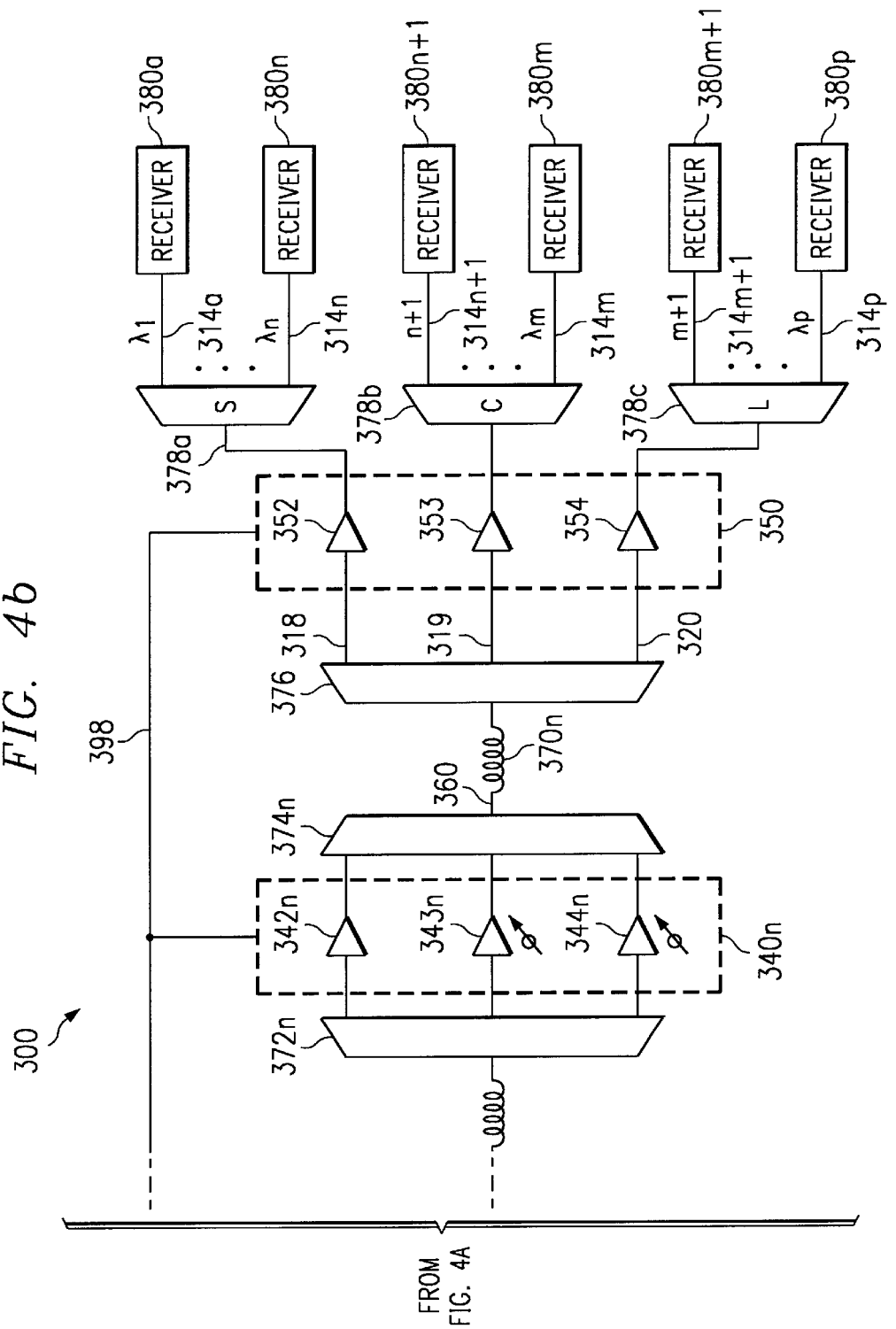

METHOD AND SYSTEM FOR REDUCING DEGRADATION OF OPTICAL SIGNAL TO NOISE RATIO

STATEMENT OF OTHER APPLICATIONS

This application discloses subject matter that is in some respects similar to that disclosed in copending application Ser. No. 09/911,103, entitled System and Method for Wide Band Amplification, filed Mar. 16, 2001.

This application also discloses subject matter that is in some respects similar to that disclosed in copending application Ser. No. 09/768,367, entitled All Band Amplifier, filed Jan. 22, 2001, application Ser. No. 09/768,367 is a continuation-in-part of U.S. application Ser. No. 09/719,591, filed Dec. 12, 2000, which claims the benefit of copending application serial number PCT/US99/13551, entitled Dispersion Compensating and Amplifying Optical Element, Method for Minimizing Gain Tilt and Apparatus for Minimizing Non-Linear Interaction Between Band Pumps, filed on Jun. 16, 1999, and published on Dec. 23, 1999 as WO 99/66607, which in turn claims the benefit of U.S. application Ser. No. 60/089,426.

These applications have been commonly assigned to Xtera Communications, Inc.

TECHNICAL FIELD OF THE INVENTION

The present invention relates to the field of communication systems, and more particularly to a method and system operable to reduce degradation of an optical signal to noise ratio when multiple communication bands are communicated over a common optical link.

BACKGROUND OF THE INVENTION

Conventional optical networks have traditionally communicated information over the conventional communication band (C-Band), which is typically identified as including wavelengths between approximately 1520 and 1560 nanometers. As optical communication service providers continually strive to increase system bandwidth, some systems have begun to investigate expanding system bandwidth by communicating information over the long band (L-Band) residing at approximately 1565 to 1610 nanometers.

When optical signals carrying multiple wavelengths of light and even multiple bands of wavelengths are communicated over one or more spans of fiber, various phenomena can cause wavelength dependent attenuation, where some wavelengths are attenuated more than other wavelengths during transmission. For example, particular optical fibers may result in longer wavelengths being attenuated more than shorter wavelengths. In other cases, the stimulated Raman scattering effect can cause higher wavelength signal components tend to rob energy from lower wavelength signal components, effectively attenuating the lower wavelength signals relative to the higher wavelength signals.

The stimulated Raman scattering effect becomes more prevalent with increases in system power, system bandwidth, and the transmission distance or number of transmission spans in the system. Multiple band communication systems having several communication spans can, therefore, be particularly vulnerable to the detrimental effects of stimulated Raman scattering. In addition, the Raman scattering effect has in the past provided a strong disincentive to even attempting to use the short communications band (S-Band) residing at approximately 1490 to 1520 nanometers. Because these phenomena result in signals being attenuated while noise levels remain constant, wavelength dependent attenuation characteristics typically lead to degradation of the optical signal to noise ratio.

One approach to addressing problems associated with Raman scattering, at least in the C-Band, involves introducing into signal wavelengths of a single communication band a negative gain tilt that is exactly opposite the gain tilt introduced by Raman scattering. This approach seeks to flatten the output power spectrum at the system's optical receivers. This approach carries a significant disadvantage, however, in that it does nothing to preserve the optical signal to noise ratio across the communication band, and often leads to degradation of that ratio, particularly in shorter signal wavelengths.

SUMMARY OF THE INVENTION

The present invention recognizes a need for a method and system operable to preserve an optical signal to noise ratio in optical transmission systems communicating signals carrying multiple wavelengths or multiple bands of signal wavelengths. In accordance with the present invention, apparatus and methods operable to reduce wavelength dependent attenuation and preserve optical signal to noise ratios are provided that substantially reduce or eliminate at least some of the shortcomings associated with prior approaches.

In one aspect of the invention, an optical communication system operable to reduce degradation of an optical signal to noise ratio where signals having multiple wavelengths are communicated over a common optical link comprises an amplifier assembly operable to introduce to a lower communication band a first gain and to introduce to a higher communication band a second gain that is different than the first gain. The amplifier assembly is further operable to introduce a variable gain tilt into one or more of the communications bands. The different gains applied between bands and the gain tilt introduced into at least one of the bands results in a reduction of a loss of optical signal to noise ratio that could otherwise be caused by wavelength dependent attenuation when the communication bands are combined and communicated over an optical link.

In one particular embodiment, the first gain introduced into the lower band can be made larger than the second gain introduced in the higher band. In addition, a negative gain tilt can be applied to at least the lower band. This embodiment reduces loss of optical signal to noise ratio that could otherwise be caused by stimulated Raman scattering.

In another aspect of the invention, a method of reducing degradation of an optical signal to noise ratio where multiple communication bands are communicated over a common optical link comprises introducing a first gain into a lower communication band comprising a first plurality of signal wavelengths and introducing a second gain that is different than the first gain into a higher communication band. The higher communication band comprises a second plurality of signal wavelengths having longer wavelengths than the first plurality of signal wavelengths. The method further comprises introducing a gain tilt into at least one of the lower and higher communication bands. The differential gains applied between bands and the gain tilt introduced into at least one of the bands results in a reduction of a loss of optical signal to noise ratio that would otherwise be caused by wavelength dependent attenuation when the communication bands are combined and communicated over an optical link.

Depending on the specific features implemented, particular aspects and embodiments of the present invention may exhibit some, none, or all of the following technical advantages. One aspect of the invention facilitates communication of signals having wavelengths from multiple communication bands, while reducing degradation of an optical signal to noise ratio associated with those signals. In a particular embodiment, the invention can facilitate optimization of the optical signal to noise ratio across multiple wavelengths within a communication band and even across multiple communication bands.

One aspect of the invention advantageously reduces differences between optical signal to noise ratios associated with the lower and higher bands to improve the system's transmission capabilities. In a particular embodiment, the invention can provide a relatively flat optical signal to noise ratio across wavelengths of each communication band, and even across multiple bands. Particular embodiments of the invention advantageously facilitate simultaneous use of multiple communications bands, even including the short communications band (S-Band) that had previously been severely impacted by Raman scattering effects.

In some embodiments of the invention, gain tilt can be introduced in whole in or part by preconditioning circuitry separate from the amplifier assembly or assemblies introducing the first and second gains. This aspect of the invention advantageously reduces or eliminates demands on the amplifiers to introduce gain tilt, or at least reduces the necessary range of the amplifiers.

One aspect of the invention facilitates tuning system elements, such as amplifiers, attenuators, and/or filters, to account for various network characteristics. In particular embodiments, the invention facilitates monitoring various network characteristics and dynamically tuning system elements to optimize, or at least reduce degradation of an optical signal to noise ratio.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
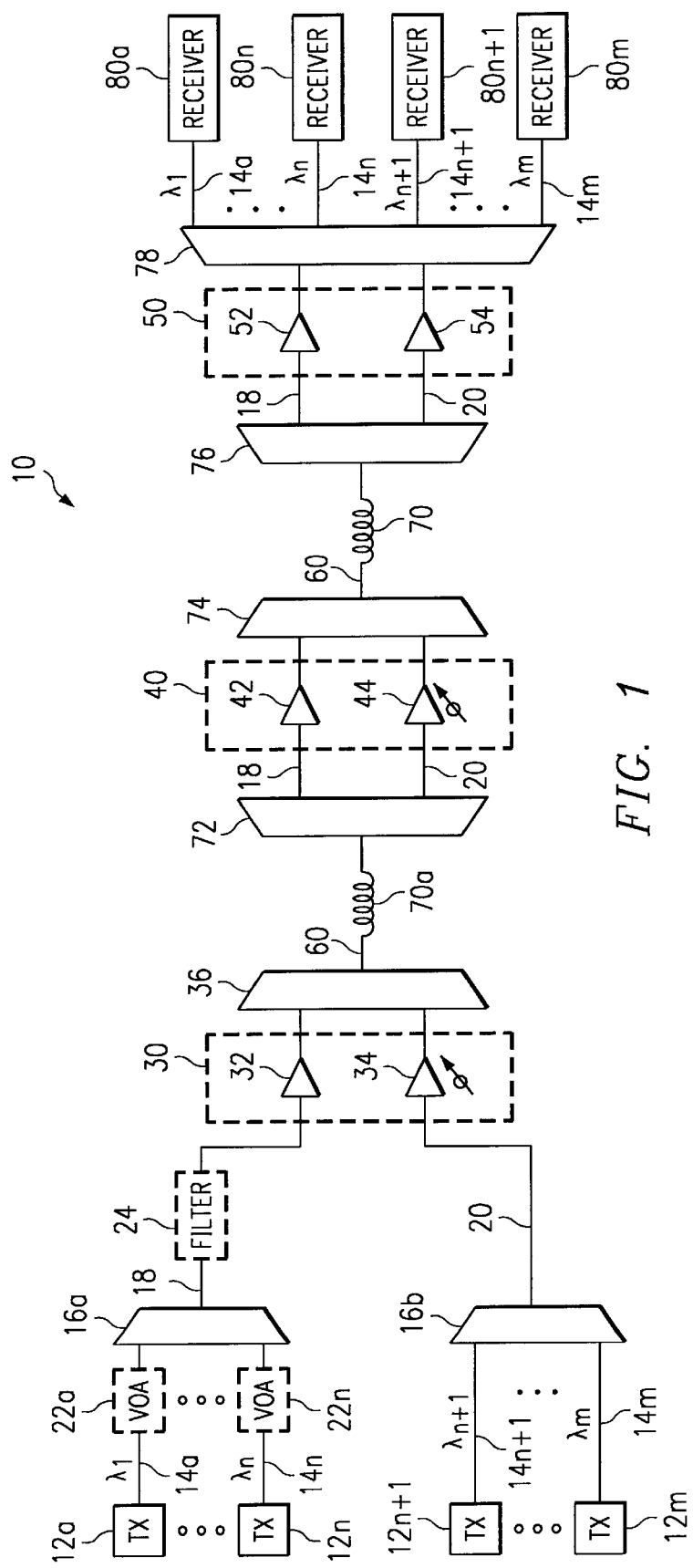
FIG. 1 is a block diagram illustrating one example of a system operable to reduce degradation of an optical signal to noise ratio associated with signals from multiple communication bands communicated over a common optical link according to the teachings of the present invention.

FIG. 1 is a block diagram illustrating one example of a system 10 operable to reduce degradation of an optical signal to noise ratio in a communication system.

In this example, system 10 includes a plurality of laser transmitters 12a–12m. Each laser 12 is operable to generate an optical wavelength signal 14 having at least one wavelength $\lambda$ of light. Throughout this description, the term "wavelength signal" describes a signal carrying at least one wavelength of light that is distinct from the wavelength or wavelengths carried by other "signal wavelengths." For ease of description, the examples described herein will assume that each wavelength signal 14 carries one unique wavelength of light. It should be recognized, however, that some or all of the signal wavelengths 14 could alternatively carry more than one wavelength of light.

In the illustrated embodiment, system 10 includes a first bank of lasers 12 operable to generate signal wavelengths 14a–14n having wavelengths $\lambda_a$–$\lambda_n$, respectively. System 10 also includes a second bank of lasers operable to generate signal wavelengths 14n+1–14m having wavelengths $\lambda_{n+1}$–$\lambda_m$, respectively. System 10 includes multiplexers 16a and 16b, which combine individual signal wavelengths 14a–14n and 14n+1–14m into bands 18 and 20 of signal wavelengths, respectively. In this example, first multiplexer 16a combines signal wavelengths 14a–14n into a first band 18 and second multiplexer 16b combines signal wavelengths 14n+1–14m into a second band 20. Although this example shows communicating two bands of signal wavelengths, system 10 can operate on any additional number of bands as well.

In a particular example, each of bands 18 and 20 may comprise one of the short band (S-Band) of wavelengths from approximately 1490 nanometers to approximately 1520 nanometers, the conventional band (C-Band) of wavelengths from approximately 1520 nanometers to approximately 1560 nanometers, or the long band (L-Band) of wavelengths from approximately 1565 nanometers to approximately 1610 nanometers. For ease of description, these examples will assume that band signals 18 and 20 each carry a full band of either the S-Band, the C-Band, or the L-Band of wavelengths. It should be noted, however, that bands 18 and/or 20 could carry less than the full complement of wavelengths typically associated with the S, C, and L bands. Moreover, the example wavelength ranges and approximate demarcation points between bands described above should not be interpreted as limiting the range of bands 18 and 20 in this invention. The wavelength boundary between bands 18 could be selected at any appropriate demarcation point.

Signal wavelengths 14a–14n of band 18 have shorter wavelengths than signal wavelengths 14n+1–14m of band 20. For ease of description, band 18 carrying signals having relatively lower wavelengths (as compared to those of higher band 20) will be referred to as lower band 18, and band 20 carrying signals having relatively higher signal wavelengths (as compared to those of lower band 18) will be referred to as higher band 20. As one particular example, signal wavelengths 14a–14n could comprise the S-Band while signal wavelengths 14a+1–14m could comprise the C-Band and/or the L-Band. As another nonlimiting example, signal wavelengths 14a–14n comprise the C-Band and signal wavelengths 14n+1–14m could comprise the L-Band. Of course, the lower band and/or the higher band could comprise less than the full complement of signal wavelengths making up a complete "band" of signals.

In this example, system 10 includes a booster amplifier assembly 30. Throughout this description, the phrase "amplifier assembly" is intended to describe a device or a combination of devices capable of introducing a gain into an optical signal. In all cases, the "assembly" comprises one or more devices that actually amplify the optical signal. In some cases, an "assembly" may also include devices that modify a gain introduced by another amplifying device, such as attenuators or filters.

Although the particular examples described here show the use of separate amplifiers to amplify each band, the invention is equally applicable to systems using a single wide band amplifier to amplify all wavelengths, even those ranging across different communication bands. Copending Application Ser. No. 09/811,103, which is incorporated by reference herein, and which was filed contemporaneously with the instant application, provides one example of such an amplifier. In short, an "amplifier assembly" can include multiple amplifying devices, or just one amplifying device.

In the illustrated embodiment, booster amplifier assembly 30 comprises a first amplifier assembly 32 operable to receive lower band 18 and to introduce a first gain into signal wavelengths 14a–14n carried by band signal 18. First booster amplifier assembly 32 could comprise any of a number of amplifier types. For example, first booster amplifier assembly 32 could include a distributed Raman amplifier, a discrete (or "lumped") Raman amplifier, or a semiconductor amplifier. As another example, first booster amplifier assembly 32 could include a rare earth doped amplifier. Depending on the wavelengths being amplified, first booster amplifier assembly might include a Thulium doped amplifier or an Erbium doped amplifier. Other optical amplifier types could be used without departing from the scope of the invention.

In the illustrated embodiment, booster amplifier assembly 30 also includes a second amplifier assembly 34 operable to receive higher band 20 and to introduce a second gain into signal wavelengths 14n+1–14m carried by higher band signal 20. Depending on the particular configuration being used, the first gain introduced by first booster amplifier assembly 32 may be greater, less or may not vary from the second gain introduced by second booster amplifier assembly 34. Like first booster amplifier assembly 32, second booster amplifier assembly 34 could comprise any of a number of amplifier types. For example, second booster amplifier assembly 34 could include a distributed Raman amplifier or a semiconductor amplifier. Alternatively, depending on the wavelengths being amplified, second booster amplifier assembly 34 might include a Thulium doped amplifier or an Erbium doped amplifier. Other optical amplifier types could be used without departing from the scope of the invention.

System 10 further includes a band coupling module 36, which operates to receive amplified versions of band signals 18 and 20 from amplifiers 32 and 34, respectively, and to combine those signals into a combined optical signal 60.

System 10 communicates combined signals 60 over optical communications link 70. Optical communication link 70 may comprise any fiber medium or combination of media operable to facilitate communication of optical signals. For example, communications link 70 may comprise a standard single mode fiber (SMF), a dispersion-shifted fiber (DSF), a non-zero dispersion-shifted fiber (NZDSF), or other fiber type or combinations of fiber types. Communication link 70 may include a plurality of spans 70a–70n. As a particular example, each span 70a–70n may comprise an approximately eighty kilometer fiber span. Other span distances could be used without departing from the scope of the invention.

In the illustrated embodiment, each of spans 70a–70n is separated by a pair of band coupling modules 72 and 74 having an in-line amplifier assembly 40 residing between modules 72 and 74. Each band coupling module 72 operates to receive combined optical signal 60 from a span 70 and to separate combined signal 60 into lower band signal 18 and higher band signal 20. Of course, if a single wide band amplifier is used to amplify all bands, the beam coupling modules residing along the transmission medium could be eliminated if desired.

In this example, in-line amplifier assembly 40 comprises a first amplifier assembly 42 operable to amplify lower band signal 18, and a second amplifier assembly 44 operable to amplify higher band signal 20. In-line amplifier assemblies 42 and 44 could include various types of amplifiers. Distributed and lumped Raman amplifiers, rare earth doped amplifiers, and semiconductor amplifiers provide just a few suitable examples.

Band coupling module 74 receives amplified signals from in-line amplifier assembly 40, and combines bands 18 and 20 to reform combined optical signal 60. Of course, various signal wavelengths 14 could be added to and/or dropped from one or more band signals at in-line amplifier assemblies 40, or at various other locations within system 10. System 10 may include any number of additional spans 70, each coupled to at least one set of band coupling modules 72/74 and in-line amplifier assemblies 40.

A final span 70n of system 10 couples a final in-line amplifier 40 to a band coupling module 76. Band coupling module 76 separates lower band signal 18 from higher band signal 20, and communicates band signals 18 and 20 toward receiver preamplifier assembly 50. In this example, a first receiver preamplifier 52 amplifies band 18, while a second preamplifier 54 amplifies band 20. Band signals 18 and 20 are then communicated to a demultiplexer 78. Demultiplexer 78 separates individual signal wavelengths 14a–14n from lower band signal 18, and separates individual signal wavelengths 14n+1–14m from higher band signal 20. Receivers 80a–80m receive and process signal wavelengths 14a–14m, respectively. Although demultiplexer 78 is described as a single demultiplexer servicing multiple bands, each band could alternatively be served by one or more separate demultiplexers.

When optical signals, such as combined signal 60 carrying multiple wavelengths of light, are communicated over one or more spans of fiber, various phenomena can cause wavelength dependent attenuation, where some wavelengths are attenuated more than other wavelengths during transmission. For example, particular optical fibers may result in longer wavelengths being attenuated more than shorter wavelengths. In other cases, phenomena such as the stimulated Raman scattering effect can cause higher wavelength signal components tend to rob energy from lower wavelength signal components, effectively attenuating the lower wavelength signals relative to the higher wavelength signals. In the case of Raman scattering, the transfer of energy from shorter wavelengths to longer wavelengths generally results in a degradation of the optical signal to noise ratio, particularly with respect to the shorter wavelength signal components. When the power spectrum of a conventional multiple wavelength system affected by wavelength dependent attenuation is examined at the system output, the spectrum exhibits a gain tilt wherein some signal wavelengths are more attenuated than other signal wavelengths. The wavelength dependent attenuation results in a degradation of the optical signal to noise ratio. In the case of Raman scattering, the transfer of energy from shorter wavelengths to longer wavelengths can result in degradation of the optical signal to noise ratio in at least the shorter wavelength signals and often in some longer signal wavelengths as well.

One aspect of this invention recognizes that the degradation of the optical signal to noise ratio caused by wavelength dependent attenuation can be reduced through a combination of applying a differential gain to higher and lower communication bands and by applying a gain tilt to at least one of the communication bands. This gain tilt can be either positive or negative as the situation dictates. As one particular example, the detrimental effects of Raman scattering can be countered by applying a smaller gain to the longer signal wavelengths as compared to the gain introduced into the shorter signal wavelengths, and introducing a negative gain tilt in at least the shorter signal wavelengths. Throughout this description, the term "negative gain tilt" describes a situation where, after application of a negative gain tilt, shorter signal wavelengths have larger magnitudes than longer signal wavelengths and vice versa for a "positive gain tilt."

For ease of description, the remainder of this description will focus on examples of applying lower gains to higher wavelengths and negative gain tilts to at least one band in an effort to counter Raman scattering effects. Based on this description, however, those of ordinary skill in the art will recognize that similar concepts could be applied to counter various other effects of wavelength dependent attenuation including the application of a positive gain tilt. For example, higher gain could be applied to higher wavelengths and positive gain tilt could be applied to one or more bands to counter affects of wavelength dependent attenuation that would otherwise cause additional attenuation in higher band signals.

Unlike other approaches that solely seek to flatten the system's output power spectrum (those approaches suffer from reduction of the optical signal to noise ratio) one aspect of the invention strives to optimize, or at least avoid degradation of, the optical signal to noise ratio. Moreover, at least some embodiments of the invention can operate to provide a flat optical signal to noise ratio across signal wavelengths within each band, and even across bands.

Figure 2A:
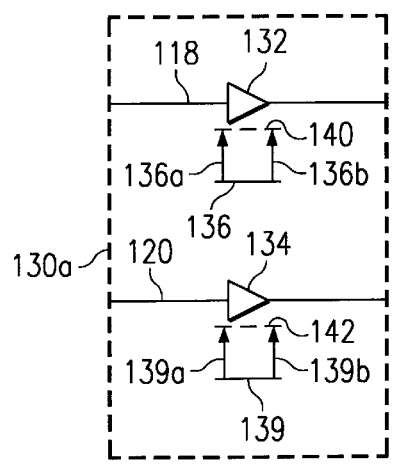
FIGS. 2a and 2b are block diagrams showing various embodiments of amplifier assemblies operable to provide differential gain between lower communication band signals and higher communication band signals constructed according to the teachings of the present invention.
Figure 2B:
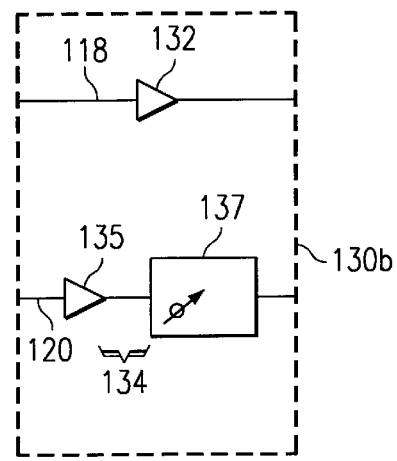

One aspect of this invention facilitates maintaining a good optical signal to noise ratio by providing at least one booster amplifier assembly 30 or in-line amplifier assembly 40 operable to introduce a first gain to lower band 18 and a second gain, which is smaller than the first gain, to higher band 20. FIGS. 2a and 2b, which will be discussed below, provide some non-limiting examples of mechanisms operable to vary the effective gain of each amplifier from its nominal setting.

Figure 3A:
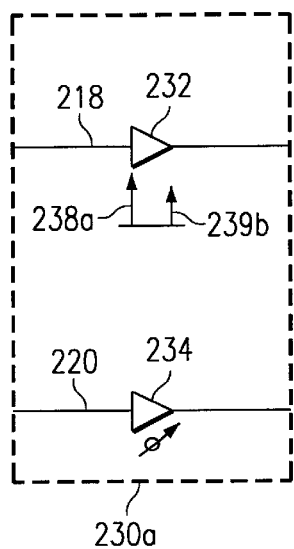
FIGS. 3a–3c are block diagrams showing various examples of mechanisms operable to introduce a gain tilt using an amplifier assembly constructed according to the teachings of the present invention.
Figure 3B:
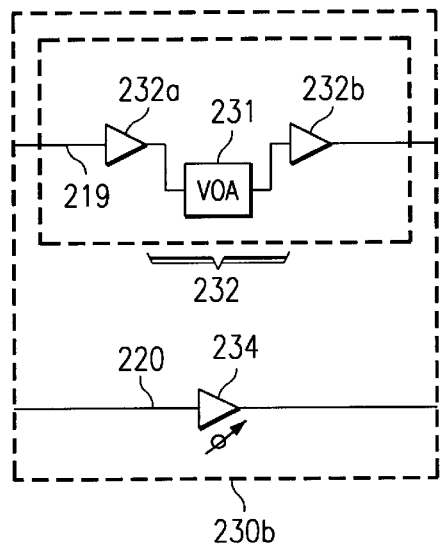
Figure 3C:
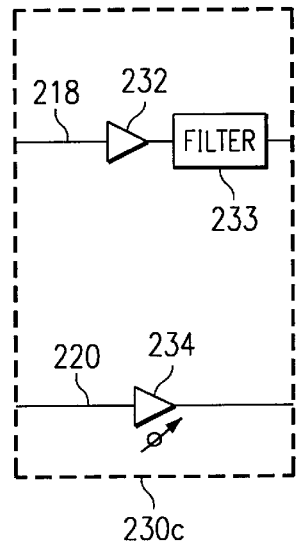

In addition, in this aspect of the invention, each of the amplifier assemblies introducing the first gain (which is larger than the second gain) is operable to either introduce a negative gain tilt into at least the lower band 18, and/or to receive lower band 18 after it has been preconditioned to include a negative gain tilt in that band. FIGS. 3a–3c, which will be discussed below, provide some non-limiting examples of amplifier designs that facilitate introducing a negative gain tilt.

As alluded to above, system 10 can introduce a negative gain tilt into at least lower band 18 through one or more of the amplifier assemblies 30 and/or 40. Alternatively, or in addition to that method, system 10 can introduce a negative gain tilt into at least lower band 18 by preconditioning that band with a negative gain tilt before it reaches amplifiers 30 or 40. For example, optical attenuators, in a particular example variable attenuators (VOA) 22a–22n, could reside between lasers 12 and first multiplexer 16a. Those attenuators 22 could introduce levels of attenuation into signal wavelengths 14a–14n, which increase as the wavelength of those signals increases. As another example, system 10 could include one or more filters 24 disposed between first multiplexer 16a and booster amplifier assembly 30. Filter 24 could selectively filter lower band signal 18 to result in a negative gain tilt across the wavelengths of lower band signal 18. Although not shown in this example, another aspect of the invention provides further optimization of the optical signal to noise ratio by introducing a negative gain tilt into each communication band. This aspect of the invention will be described in more detail below.

Through a combination of introducing a smaller gain in the higher band signals compared to the gain introduced in the lower band signal, and introducing a negative gain tilt into at least the shorter band signal, this aspect of the invention provides a significant advantage of maintaining a good optical signal to noise ratio by preempting or at least reducing the onset of a stimulated Raman scattering effect.

In operation, lasers 12 generate a plurality of signal wavelengths 14, each carrying one or more distinct wavelengths. First multiplexer 16a combines a first plurality of signal wavelengths 14a–14n into lower band signal 18. As particular examples, lower band signal 18 may comprise wavelengths from, for example, the short communications band (S-Band) or the conventional communications band (C-Band). Second multiplexer 16b combines a second plurality of signal wavelengths 14n+1–14m into higher band signal 20. As particular examples, higher band signal 20 may comprise wavelengths from the conventional band and/or the long band.

System 10 may precondition lower band 18 to introduce a negative gain tilt across signal wavelengths 14 of lower band 18. Examples of mechanism for preconditioning bands with a negative gain tilt include implementing a plurality of optical attenuators residing between lasers 12 and first multiplexer 16a, or implementing one or more filters 24 residing between first multiplexer 16a and booster amplifier assembly 30. In another embodiment, system 10 could also precondition higher band 20 by introducing a negative gain tilt into that signal in a similar manner.

Booster amplifier assembly 30 receives lower band 18 and higher band 20. First booster amplifier assembly 32 introduces a first gain into lower band 18. In addition, first booster amplifier assembly 32 may introduce a negative gain tilt into lower band 18. In some cases, system 10 may rely solely on a negative gain tilt introduced through preconditioning lower band signal 18, for example, with attenuators 22 or filter 24. In other cases, system 10 may use the negative gain tilt introduced through preconditioning as a baseline, and introduce additional negative gain tilt in amplifier assembly 32. This approach provides an advantage of reducing the amount of gain tilt for which amplifier assembly 32 is responsible. In still another embodiment, system 10 may not precondition lower band signal 18 at all, and instead rely solely on amplifier assemblies, such as assemblies 30 and/or 40 to introduce appropriate negative gain tilt.

Second amplifier assembly 34 receives higher band signal 20 and introduces a second gain into that signal. In this example, the second gain is selected to be a smaller gain than first gain introduced into lower band signal by first amplifier assembly 32.

Band combining module 36 combines lower band 18 and higher band 20 into combined optical signal 60, and communicates combined signal 60 over optical span 70a. Band combining module 72 receives signal 60, separates lower band 18 from higher band 20, and communicates those bands to in-line amplifier assembly 40. In-line amplifier assembly 40 applies gain to the lower and higher bands. In a particular embodiment, in-line amplifier assembly 40 applies a first gain to lower band 18 and a second gain, which is lower than the first gain, to higher band 20. Optionally, in-line amplifier assembly 40 may introduce a negative gain tilt into lower band 18 and/or higher band 20. Applying lower gains to higher band 20 than lower band 18, and introducing a negative gain tilt into at least lower band 18 at in-line amplifier assembly 40 provides an advantage of reducing the effects of stimulated Raman scattering along each span 70.

Band coupling module 74 combines amplified bands 18 and 20 into a combined signal 60 and communicates combined signal 60 over the next span 70. Any number of spans 70 and in-line amplifier assemblies 40 could be used without departing from the scope of the invention. In-line amplifier assemblies 40 operable to introduce higher gains into lower band 18 than higher band 20, and to introduce a negative gain tilt into at least lower band 18 could be implemented to reduce the Raman scattering effects along each span.

Final band coupling module 76 receives combined signal 60 from final span 70n and separates lower band 18 from higher band 20. Preamplifier assembly 50 may amplify bands 18 and 20. Demultiplexer 78 separates individual signal wavelengths 14a–14n from lower band 18, and separates signal wavelengths 14n+1–14m from higher band 20. From there, individual signal wavelengths 14a–14m are passed to appropriate receivers 80a–80m.

Through an appropriate combination of the gain applied to lower band 18 as compared to the gain applied to higher band 20, and an introduction of a negative gain tilt into at least lower band signal 18, system 10 facilitates reduction of degradation of the optical signal to noise ratio that would otherwise be experienced due to a stimulated Raman scattering effect. In addition, this aspect of the invention reduces cross-talk across channels that would normally result from Raman scattering.

FIGS. 2a and 2b are block diagrams showing various embodiments of amplifier assemblies operable to provide differential gain between lower band signals 118 and higher band signals 120.

FIG. 2a is a block diagram of an amplifier assembly 130, including a first amplifier 132 receiving lower band signal 118, and a second amplifier 134 receiving higher band signal 120. In this example, the output launch power of each amplifier 132 and 134 is determined according to the amplitude of pump signals 136 and 138, respectively. In this example, first amplifier 132 is driven by two pump signal wavelengths 136a and 136b, while second amplifier 134 is driven by two pump signal wavelengths 138a and 138b. Dashed lines 140 and 142 represent pump power levels for first amplifier 132 and second amplifier 134, respectively, that will facilitate a nominal amplifier launch power. As a particular example, a nominal launch power for amplifier assemblies 132 and 134 may be 19 decibels above one milliwatt (dBm). In this example, pump signal wavelengths 136a and 136b are set to provide operation of first amplifier 132 at its nominal launch power. Pump signal wavelengths 138a and 138b of second amplifier 134, however, have been reduced below nominal operating state 142, so that second amplifier 134 operates at a launch power below its nominal launch power setting. Of course, a similar effect can be achieved by increasing pump signal wavelengths 136 of amplifier 132 relative to pump signal wavelengths 138 of second amplifier 134.

The launch power of amplifier assembly 134 amplifying higher band 20 can be selected depending on a variety of factors. For example, the characteristics of the transmission fiber (including its loss characteristics and Raman gain coefficient), the loss per span, the number of spans, the characteristics of the channels (including the number of channels and channel spacing), the desired optical signal to noise-ratio, and the amount of negative gain tilt being introduced, can all help determine the appropriate launch power of second amplifier assembly 134 as compared to first amplifier assembly 132.

FIG. 2b is a block diagram showing another embodiment of an amplifier assembly 130b operable to provide different levels of gain to lower band signal 118 and higher band signal 120. In this embodiment, amplifier assembly 130b includes a first amplifier 132 and second amplifier assembly 134. Second amplifier assembly 134 includes an amplifier 135 coupled to an attenuator 137. In this example, amplifiers 132 and 135 of amplifier assembly 130b each operate at a common nominal output launch power setting. The effective launch power of second amplifier 135, however, is reduced as compared to that of first amplifier 132, because the output of second amplifier 135 is attenuated by attenuator 137.

The example techniques described with respect to FIGS. 2a and 2b could be applied to either or both of booster amplifier assembly 30 and/or in-line amplifier assemblies 40.

FIGS. 3a–3c are block diagrams showing various examples of mechanisms operable to introduce a negative gain tilt using an amplifier assembly. Amplifier assembly 230a shown in FIG. 3a includes a first amplifier 232 and second amplifier 234. Negative gain tilt, in this embodiment, is achieved by varying the amplitude of pump signal wavelengths 238a and 238b. In particular, by reducing the amplitude of pump wavelength signal 238b as compared to pump wavelength signal 238a, the amplifier gain resulting from the combination of pump signal wavelengths 238a and 238b exhibits a negative gain tilt. Although this embodiment shows just two pump signal wavelengths 238, any number of pump signal wavelengths can be used with amplifier 232 to provide additional control over the characteristics of the negative gain tilt introduced.

Amplifier assembly 230b shown in FIG. 3b provides another example of a mechanism operable to introduce a negative gain tilt into at least lower band signal 218. In this embodiment, amplifier assembly 230b includes first amplifier assembly 232 receiving lower band signal 218, and second amplifier assembly 234 receiving higher band signal 220. In this embodiment, first amplifier 232 comprises a rare earth doped amplifier, such as a Thulium doped amplifier. First amplifier 232 includes a first amplifying stage 232a and a second amplifying stage 232b, with a variable optical attenuator 231 coupled between the first and second amplifier stages. By varying the voltage applied to variable optical attenuator 231, the inversion in amplifier 232 is varied, which can create a selective negative gain tilt in first amplifier 232.

Amplifier assembly 230c shown in FIG. 3c provides still another example of a mechanism operable to introduce a negative gain tilt into at least lower band signal 218. In this example, amplifier assembly 230c includes a first amplifier 232 receiving lower band signal 218 and a second amplifier 234 receiving higher band signal 220. In this example, the output of first amplifier 232 is coupled to a filter 233. Filter 233 operates to selectively filter wavelengths received to result in a negative gain tilt across the spectrum of lower band signal 218. Filter 233 may be a statically set filter, or may be adjustable in response to one or more control signals.

The slope of the negative gain tilt introduced can be selected depending on a variety of factors. For example, the characteristics of the transmission fiber (including its loss characteristics and Raman gain coefficient), the loss per span, the number of spans, the characteristics of the channels (including the number of channels and channel spacing), the desired optical signal to noise-ratio, and the launch power of the amplifiers, can all help determine the appropriate launch power of second amplifier assembly 234 as compared to first amplifier assembly 232.

Figure 4A:
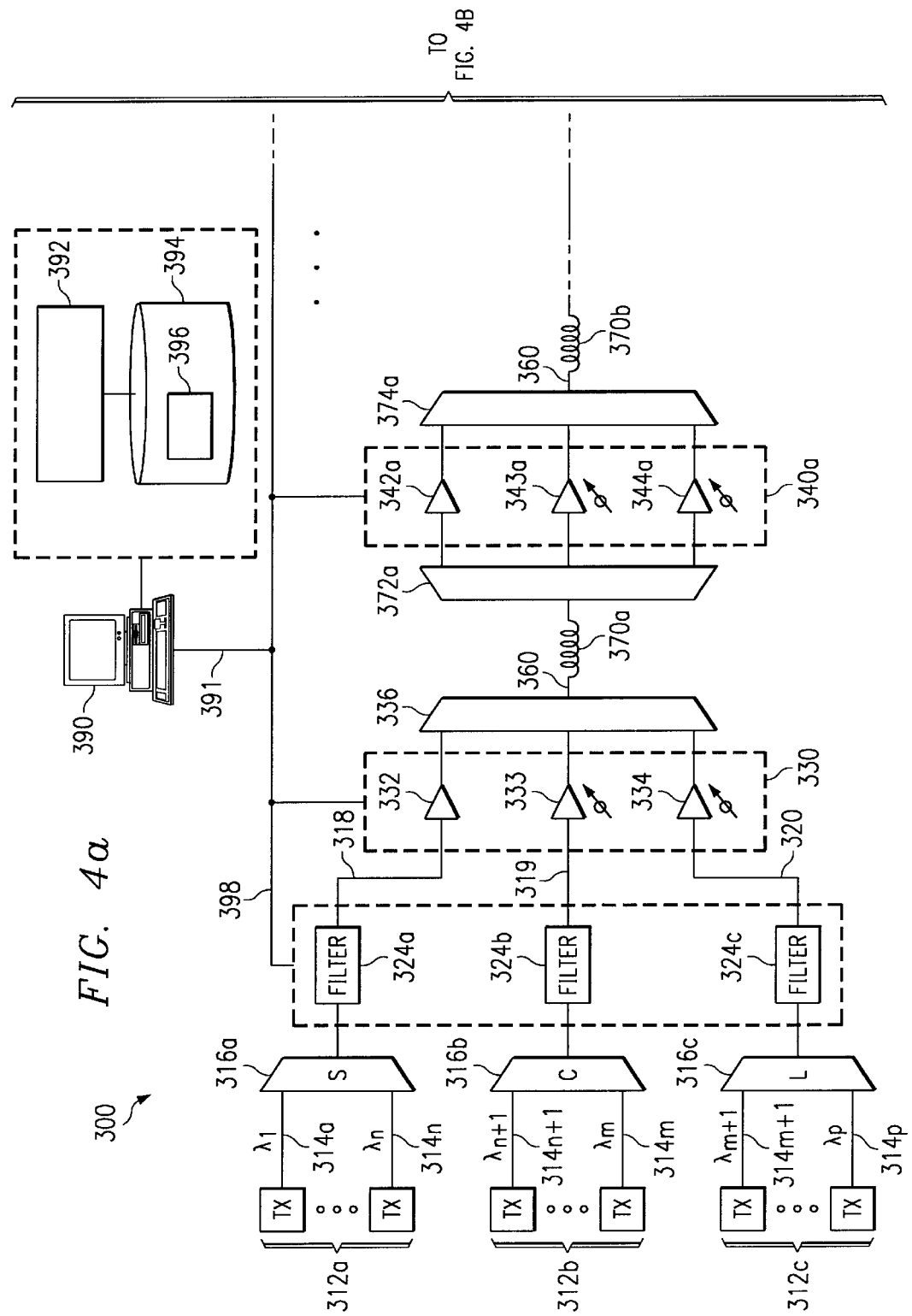
FIG. 4 is a block diagram showing another example embodiment of a system operable to reduce degradation of an optical signal to noise ratio associated with signals from multiple communication bands communicated over a common optical link according to the teachings of the present invention.

FIG. 4 is a block diagram showing an example of another embodiment of a system 300 operable to reduce degradation of system performance due to stimulated Raman scattering. System 300 includes a first bank of laser transmitters 312a operable to generate wavelengths signals 314a–314n having wavelengths that are relatively short compared to other wavelengths communicated by system 300. In a particular embodiment, transmitter bank 312a may generate wavelengths falling within or comprising the short communication band (S-band).

System 300 also includes a bank of laser transmitters 312c operable to generate signal wavelengths 314m+1–314p. Signal wavelengths 314m+1–314p have longer wavelengths relative to other wavelengths communicated by system 300. In a particular example, wavelengths generated by laser bank 312c may fall within or comprise the long communications band (L-band).

In this embodiment, system 300 also includes a bank of laser transmitters 312b operable to generate signal wavelengths having wavelength intermediate to those generated by laser banks 312a and 312c. In a particular embodiment, wavelengths 314n+1–314m generated by laser bank 312b may reside in or comprise the conventional communication band (C-band). Each bank of transmitters 312a–312c feeds into an associated multiplexer 316a–316c, respectively. Multiplexer 316a operates to receive signal wavelengths 314a–314n from laser bank 312a and to combine those signals into a lower band signal 318. Multiplexer 316b operates to receive signal wavelengths 314n+1–314m from laser bank 312b and to combine those signals into a mid band signal 319. Multiplexer 316c operates to receive signal wavelengths 314m+1–314p from laser bank 312c and to combine those signals into higher band signal 320. As used in this description, the terms "lower band," "mid band," and "higher band" are intended to denote relative comparisons only. The terms "low," "mid," and "high" are not intended to denote any particular wavelength values.

In this particular example, system 300 includes filters 324a–324c, which are operable to receive band signals 318–320, respectively, and to introduce negative gain tilts into those signals. In this manner, system 300 preconditions band signals 318–320 to exhibit preselected gain tilts. As described with respect to FIG. 1, filters 324 could alternatively be replaced with variable attenuators residing between transmitter banks 312 and multiplexers 316. Although this example shows filters 324 imparting negative gain tilts to each of band signals 318–320, one or more of those filters could be removed from system 300 without departing from the scope of the invention. In addition, as described in FIG. 1, system 300 could operate without providing any mechanisms for preconditioning band signals 318, 319, or 320. In providing a mechanism for preconditioning at least lower band signal 318, this embodiment provides an advantage of reducing the amount of negative gain tilt to be introduced by amplifiers 330, 340, and/or 350.

The illustrated embodiment of system 300 includes booster amplifiers 330 operable to receive band signals 318–320 from multiplexers 316. In this example, booster amplifier assembly 330 includes a first booster amplifier assembly 332 operable to receive and amplify lower band signal 318, second amplifier assembly 333 operable to receive and amplify mid band signal 319, and third amplifier assembly 334 operable to receive and amplify higher band signal 320.

In this particular example, amplifier assemblies 333 and 334 are configured to provide a lower level gain than the gain provided by first amplifier 332 to lower band signal 318. Furthermore, in this example, third amplifier assembly 334 is configured to provide a lower level of gain to higher band signal 320 than second amplifier assembly 333 provides to mid band signal 319. As discussed with respect to FIGS. 2a and 2b, amplifier assemblies 332, 333, and 334 can be configured to provide differing levels of gain, for example, by adjusting the pump power input to each amplifier, or by placing an attenuator after the amplifiers desired to have reduced effective launch power.

In this embodiment, each amplifier of amplifier assembly 330 operates to introduce a selected negative gain tilt into the band signal it receives. As discussed with respect to FIGS. 3a–3c, a negative gain tilt can be introduced at amplifiers 330 by, for example, varying the pump signal wavelengths driving the amplifiers, inserting a variable optical attenuator between stages of a rare earth doped amplifier, or inserting a filter after the output of the amplifier. Although this example assumes a negative gain tilt is introduced into each of band signals 318–320, as discussed with respect to FIG. 1, it is not necessary that a negative gain tilt be introduced into every band signal, nor is it necessary that any negative gain tilt be introduced at booster amplifier 330.

System 300 further includes a plurality of in-line amplifiers 340a–340n coupled between communication spans 370. As a particular example, system 300 may include five communication spans 370 and three in-line amplifier assemblies 340. In this particular example, each in-line amplifier assembly 340 includes a first in-line amplifier assembly 342 operable to receive and amplify lower band signal 318, a second in-line amplifier assembly 343 operable to receive and amplify mid band signal 319, and a third in-line amplifier assembly 344 operable to receive and amplify higher band signal 320.

In this particular example, in-line amplifier assemblies 343 and 344 are configured to provide a lower level gain than the gain provided by first in-line assembly 342 to lower band signal 318. Furthermore, in this example, third in-line amplifier assembly 344 is configured to provide a lower level gain to high band signal 320 than second in-line amplifier assembly 343 provides to mid-band signal 319. In this embodiment, each in-line amplifier assembly 340 also operates to introduce a selective negative gain tilt into each band signal it receives.

Although this example introduces a negative gain tilt into each of band signals 318–320, as discussed with respect to FIG. 1, it is not necessary that a negative gain tilt is introduced into every band signal, nor is it necessary that any negative gain tilt be introduced at in-line amplifier 340. Introducing negative gain tilt into each band signal 318–320 at each in-line amplifier assembly 340 provides an advantage, however, in reducing detrimental effects associated with Raman scattering along each span of communication link 70.

Band signals 318–320 are received from final in-line amplifier assembly 340 by a band coupling module 374n. Band coupling module 374n combines band signals 318–320 into combined signal 360, and communicates that signal toward band coupling module 376 associated with receivers 380. Preamplifier assemblies 350 are coupled to band coupling module 376, and operate to provide additional amplification to band signals 318–320 after those signals are separated from combined signal 360 by band coupling module 376. In a particular embodiment, preamplifiers 350 could be configured to provide a higher gain level in amplifier 352 handling lower band signal 318 as compared to amplifiers 353 and 354 handling mid and higher band signals 319 and 320. In addition, in a particular embodiment, preamplifier assembly 350 could be configured to introduce negative gain tilts into band signals 318–320.

System 300 also includes demultiplexers 378a–378c operable to receive band signals 318–320, respectively, and to separate individual signal wavelengths 314a–314p from band signals 318–320. Receivers 380 receive and process individual signal wavelengths 314 received from demultiplexers 378.

In operation of the particular example shown in FIG. 4, system 300 generates a lower band of signal wavelengths 318 comprising a plurality of individual signal wavelengths 314a–314n, a mid band signal comprising a plurality of higher signal wavelengths 314n+1–314m, and a higher band signal 320 comprising still higher signal wavelengths 314m+1–314p. System 300 preconditions each of band signals 318–320 with a particular negative gain tilt. In this example, gain tilts are applied to bands 318–320 by passing those signals through filters 324a–324c, respectively, having frequency responses designed to impart a particular gain tilt to each band signal. Band signals 318–320 are then amplified by booster amplifier assembly 330. First booster amplifier assembly 332 amplifies lower band signal 318 with a first gain. Second booster amplifier assembly 333 amplifies mid band signal 319 with a second gain that is smaller than the first gain. Third booster amplifier assembly 334 amplifies higher band signal 320 with a third gain that is smaller than the first gain and the second gain.

In addition, each of booster amplifier assemblies 332–334 introduces a particular negative gain tilt into its associated band signal. Amplified band signals 318–320 are combined by band coupling module 336 to form combined signal 360. Combined signal 360 is communicated over first span 370a to first in-line amplifier assembly 340a. Band coupling module 372a separates band signals 318–320 from combined signal 360 and communicates band signals 318–320 to in-line amplifier assemblies 342–344, respectively. First in-line amplifier assembly 342 introduces a first gain into lower band signal 318. Second in-line amplifier assembly 343a introduces a second gain, which is smaller than the first gain, into mid band signal 319. Third in-line amplifier assembly 344a introduces a third gain, which is smaller than the first gain and the second gain, into higher band signal 320. In addition, each of in-line amplifier assemblies 342a–344a applies a specified negative gain tilt to band signals 318–320. After amplification, band coupling module 374a combines band signals 318–320 to again form combined signal 360, and communicates combined signal 360 over the next span 370b to the next in-line amplifier assembly 340b.

In this particular example, the amplification steps described above with respect to first in-line amplifier assembly 340a are repeated at each in-line amplifier assembly 340b–340n. In this manner, system 300 reduces degradation otherwise associated with the Raman scattering effect at each span in communication system 300.

Band coupling module 376 receives combined signal 360, separates band signals 318–320, and feeds band signals 318–320 to preamplifier assembly 350. Band signals 318–320 are amplified and fed to demultiplexers 378, where band signals 318–320 are demultiplexed into their component signal wavelengths 314a–314p. Those signals are then communicated to receivers 380.

One aspect of the invention facilitates system tunability to provide dynamic optimization upon changing system characteristics. In the illustrated embodiment, system 300 includes a controller 390. Controller 390 may comprise any computing and/or communication device operable to communicate control signals 391 to one or more elements of system 300 to effect at least some aspects of the operation of those elements. Controller 390 may comprise, for example, a mainframe computer, a mini-frame computer, a personal computer, a lap top computer, a personal digital assistant, or any other computing and/or communication device or combination of devices. In particular embodiments, controller 390 could comprise a network manager or an element manager in an optical network or subnetwork.

Controller 390 communicates with other elements of system 300 over a communication link 398. Communication link 398 may comprise any wireless or wireline, electrical or optical communication medium or combination of media. In a particular embodiment, communication link 398 may comprise all or a portion of a communication network including, for example, a local area network, a wide area network, a metro area network, or a global computer network, such as the Internet.

Controller 390 includes a processor operable to execute various algorithms or processes including an optimization process 396. In this example, optimization process 396 comprises software stored in a memory 394. Alternatively, all or a portion of optimization process could comprise hardware or firmware within or accessible to controller 390. Memory 394 may comprise any hardware, firmware, software, or combination thereof operable to store and facilitate retrieval of information, such as optimization process 396. Examples of memories include a read only memory, a random access memory, and magnetic or optical memory storage devices such as a cd-ROM or floppy disk, to name a few. Although memory 394 is shown as residing within controller 390, all or a portion of memory 394 could alternatively reside at a location remote from, but accessible to, manager 390.

Optimization process 396 operates to generate control signals 391 that can be communicated to various network elements, such as filters 324 and/or amplifier assemblies 330, 340, and/or 350. Through control signals 391, optimization process 396 can effect the operation of various network elements to improve various performance characteristics of system 300. For example, optimization process 396 may effect the launch powers of amplifiers 330, 340, and/or 350, and/or negative gain tilts introduced by those amplifiers (and/or introduced by way of preconditioning elements such as filters 324) to provide an approximately flat optical signal to noise ratio across wavelengths within bands, and even across communication bands.

Controller 396 can also monitor various aspects of system 300, to provide dynamic adjustment to parameters, such as amplifier launch power and/or gain tilt, as system characteristics such as channel numbers and spacings vary over time.

Figure 5A:
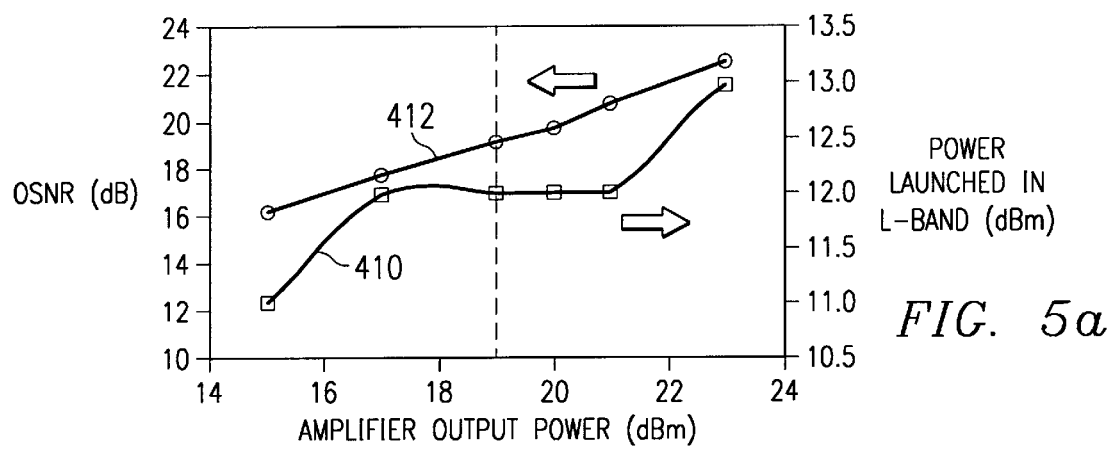
FIGS. 5a–5c are graphs illustrating one particular example of an optimized system operable to provide a substantially flat optical signal to noise ratio over wavelengths in each band, and across communication bands according to the teachings of the present invention.
Figure 5B:
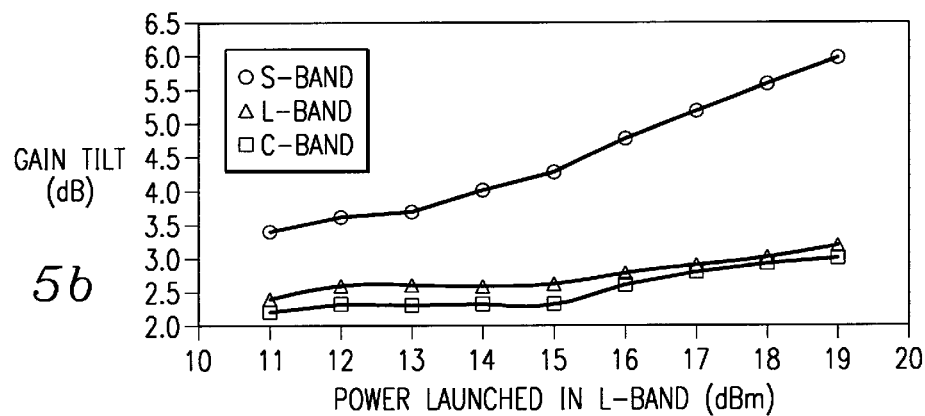
Figure 5C:
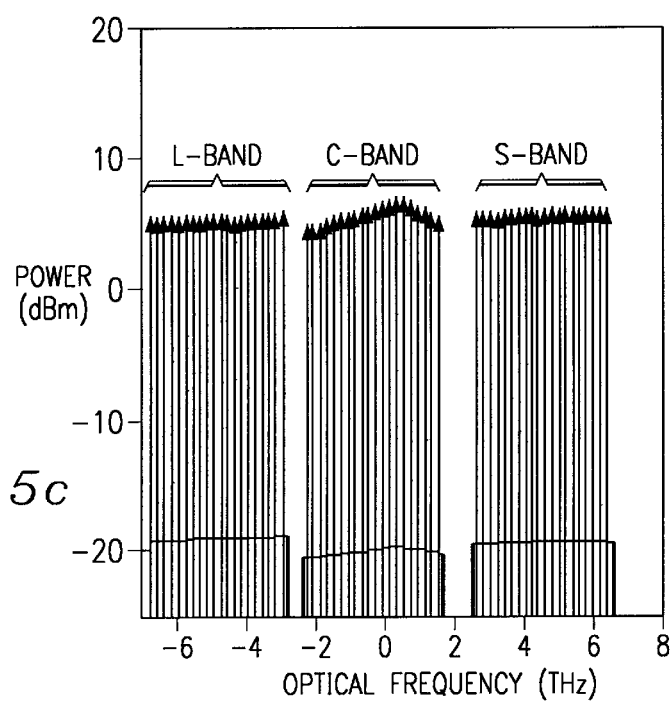

FIGS. 5a–5c are graphs illustrating one particular example of an optimization of system 300 to provide a flat optical signal to noise ratio over wavelengths in each band, and across communication bands. This example assumes particular fiber loss characteristics and channel characteristics. Similar optimizations could be developed for other fibers and other system configurations.

In this particular example, each band 318–320 includes 80 channels, or signal wavelengths, each separated by a channel spacing of approximately 50 gigahertz. System 300 includes five spans 70 of communication link between transmitter laser banks 312 and receivers 380. In this example, each span comprises a fiber span exhibiting a 28.5 decibel loss in the shortest wavelength band. This particular fiber is fairly lossy, and especially lossy in the S-Band. Although more efficiently operating fiber spans could be used in system 300, the present example shows optimization over a particularly lossy span.

This example achieves optimization of the optical signal to noise ratio using reduced launch power in the C-band as compared to the S-band, and reduced launch power in the L-band as compared to the S-band and the C-band. In addition, this example implements a negative gain tilt into each communication band.

FIG. 5a graphically depicts optimized optical signal to noise ratio levels that can be obtained using particular amplifier launch powers and particular negative gain tilts. For ease of description, the following discussion will refer to in-line amplifier assemblies 340. The discussion could also apply to booster amplifier assemblies 330 and/or preamplifier assemblies 350.

The horizontal axis of FIG. 5a shows the launch power of S-Band amplifier assembly 342. The right side vertical axis of FIG. 5a shows launch power for L-Band amplifier assembly 344. The left side vertical axis of FIG. 5a shows the optical signal to noise ratio (ONSR) attainable as an approximately flat value across communication bands in this example.

The graph in FIG. 5a shows the result of application of optimization process 396 to determine, for a given nominal launch power in S-Band amplifier assembly 342, the appropriate launch power to be used in the associated L-Band amplifier assembly 344 that will result in a substantially flat optical signal to noise ratio across communications bands 318–320. For example, for an S-Band amplifier assembly 342 with a 19 dBm nominal launch power, optimization process 396 determines that (assuming application of appropriate gain tilt values) the appropriate launch power in L-Band amplifier assembly 344 is approximately 12 dBm. These system settings result in an optical signal to noise ratio of approximately 19 decibels across communication bands 318–320.

FIG. 5b illustrates example negative gain tilt values optimized according to particular power launch powers in the L-band. In this example, for an 8 dBm L-band launch power, an approximately 3.6 decibel gain tilt should be introduced in the S-band, an approximately 2.3 decibel negative gain tilt should be introduced into the C-band, and an approximately 2.6 decibel negative gain tilt should be introduced into the L-band. As shown in FIG. 5b, for this example, as the power launched in the L-band increases, the level of negative gain tilt introduced into the S-band signals should increase to offset the Raman on scattering effect.

FIG. 5C graphically illustrates output spectra measured at approximately the outputs of preamplifier assemblies 350 for the S-band 318, the C-band 319, and the L-band 320. As shown in FIG. 5C, for system using five spans of a fiber exhibiting an approximately 28.5 decibel loss per span in the S-Band, amplifier launch powers of approximately 19 dBm for the S-band, 15.5 dBm for the C-band, and 12 dBm for the L-band, as well as negative gain tilts of approximately 3.6 decibels in the S-band, 2.3 decibels in the C-band, and 2.6 decibels in the L-band, system 300 achieves an approximately flat optical signal to noise ratio across wavelengths of each band, and also across communication bands.

Note that while the output power spectra may not always be completely flat, the optical signal to noise ratio across each band does remain substantially flat. For example, the noise figure over the C-band shown in FIG. 5b exhibits a slight hump at approximately 195 Terahertz. However, the output power spectra exhibits an approximately symmetrical hump at approximately the same frequency to ensure a substantially flat optical signal to noise ratio across the band.

The particular ratios of the amplifier launch powers and the particular values of negative gain tilt introduced that will result in optimized optical signal to noise ratios will depend on the particular system characteristics. For example, the total system power, the system bandwidth, and the transmission distance will all effect the launch power ratios and gain tilt values used. The numerical examples described above provide just one example of an optimization for a particular system configuration using a particular fiber type. The invention is not intended to be limited to the details of that example.

Figure 6:
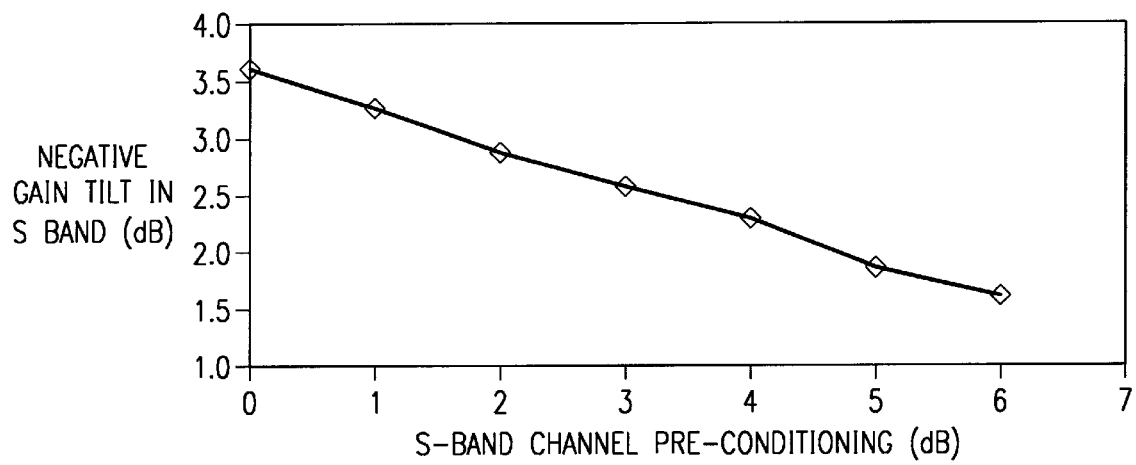
FIG. 6 is a chart showing example effects of preconditioning signals prior to amplification.

FIG. 6 is a chart showing examples of how preconditioning signals with gain tilt prior to amplification can reduce or eliminate the need for introducing gain tilt within the system's amplifiers. As shown in this chart, for a 19 dBm launch power in the S-Band and a 12 dBm launch power in the L-Band, increasing the amount of pre-conditioning to at least the lower-band signal can reduce or eliminate the need to introduce gain tilt at the amplifiers in the system.

Figure 7:
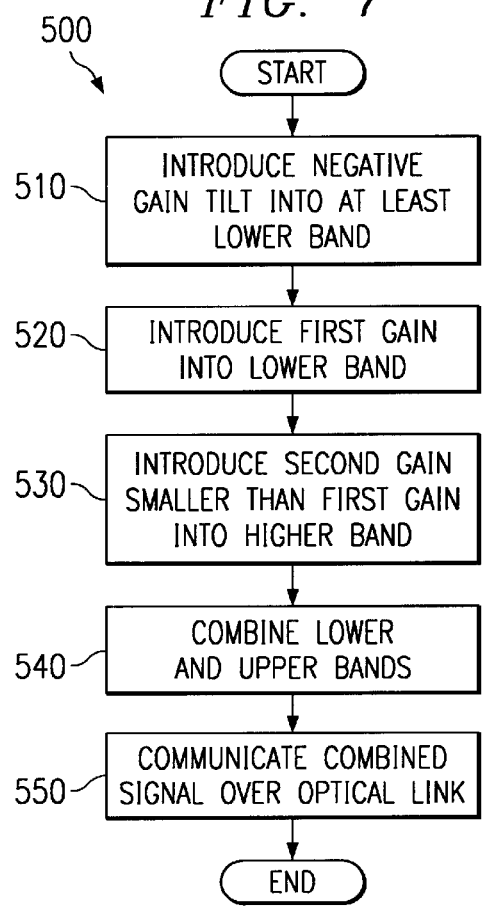
FIG. 7 is a flow chart showing one example of a method of reducing degradation of an optical signal to noise ratio in a multiple communication band system.

FIG. 7 is a flow chart showing one example of a method 500 of reducing degradation of an optical signal to noise ratio in a multiple communication band system. This example uses system 300 shown in FIG. 4 to illustrate steps of method 500. Other systems, such as system 100 shown in FIG. 1 could be used without departing from the scope of the invention.

Method 500 begins at step 510 where system 300 introduces a negative gain tilt into at least lower communication band 318. Although this example discusses introducing negative gain tilt into the lower band signal 318, negative gain tilts could also be applied to mid band signal 319 and/or higher band signal 320. The descriptions below giving examples of mechanisms operable to apply negative gain tilt to lower band 318 could be applied in an analogous manner to mid band 319 and higher band 320.

System 300 may introduce all or a portion of the negative gain tilt into lower band 318, for example, by preconditioning lower band 318 with a negative gain tilt. For example, system 300 could pass signal wavelengths 314a–314n through variable attenuators set to introduce more attenuation into longer signal wavelengths than shorter signal wavelengths. Alternatively, band signal 318 can be passed through filter 324, where filter 324 is operable to attenuate longer wavelength components of band signal 318 more than the shorter wavelength components of those signals.

Alternatively, or in addition to introducing negative gain tilt through preconditioning circuitry, system 300 can introduce negative gain tilt into lower band 318 at one or more of amplifier assemblies 330, 340, and/or 350. For example, the amplifier assemblies can use multiple wavelength pump signals having decreasing intensities for pump signals associated with longer wavelengths. The combined effect of the multiple wavelength pump signals is to introduce a negative gain tilt at the amplifier. Alternatively, rare earth doped amplifiers having variable optical attenuators disposed between amplification stages could be used to create an inversion effect to introduce a negative gain tilt. As still another example, one or more filters could reside at the output of the amplifier, wherein the filters operate to attenuate longer signal wavelengths more than shorter signal wavelengths.

The method continues at step 520 where system 300 introduces a first gain into lower band 318. System 300 also introduces a second gain, which is smaller than the first gain, into higher band 320 at step 520. In a particular embodiment, first amplifier 332 introduces a first gain into lower band 318, while amplifier 334 introduces a second gain into higher band signal 320. The second gain can be made smaller than the first gain, for example, by applying lower magnitude pump signal wavelengths to amplifier 334 than those applied to amplifier 332. Alternatively, an attenuator can be placed at the output of amplifier 334 to reduce the effect of launch power of that amplifier relative to the launch power of amplifier 332 processing lower band 318. Where system 300 communicates three communication bands, including mid communication band 319, system 300 may introduce to mid band signal 319 a third gain that is smaller than the first gain applied to lower band signal 318 and larger than the second gain applied to higher band signal 320.

System 300 combines lower band signal 318 and upper band signal 320 into a combined signal 360 at step 540. In a particular embodiment, band coupling module 336 combines band signals 318–320 to form combined signal 360. Where system 300 also utilizes mid band signal 319, band coupling module 336 can couple lower band 318, mid band 319, and higher band 320 signals into combined signal 360.

System 300 communicates combined signal 360 over optical link 370 at step 550. Optical link 370 may comprise one of a plurality of fiber spans in communication system 300. The lower actual or effective launch power of the amplifier assembly processing higher band 320 as compared to amplifier assembly 332 processing lower band 318, combined with the negative gain tilt applied to at least lower band 318 advantageously reduces Raman scattering, and reduces or eliminates degradation of the optical signal to noise ratio of at least the lower band. In a particular embodiment, steps 510 through 550 can be repeated at each inline amplifier assembly 340 residing between communication spans 370. In this manner, system 300 avoids degradation of the optical signal to noise ratio along each communication span, increasing the performance of system 300.

By applying lower gain values to higher band signals than lower band signals, and applying appropriate negative gain tilts to both the higher and the lower band signals, system 300 advantageously facilitates reducing differences between the optical signal to noise ratios of the lower and higher bands. Though appropriate choice of amplifier launch powers and negative gain tilt values, system 300 can provide a substantially flat optical signal to noise ratio between signal wavelengths and across communication bands. The particular embodiment shown in FIG. 4 can reduce differences in the optical signal to noise ratios between bands to one decibel or less.

In a particular embodiment, controller 390 may monitor various characteristics of system 300, such as the number of channels 314 being utilized, the spacing between channels, and various other system characteristics. Controller 390 executes an optimization algorithm 396 operable to determine appropriate launch powers and negative gain tilts to be applied for given system characteristics. Controller 390 can monitor system characteristics and detect changes in those characteristics. Based on those changes, optimization process 396 can generate control signals 391 operable to change the gains and/or gain tilts introduced by system 300 into the various communication bands 318–320. Through appropriate selection of relative gain values applied to the different communication bands and negative gain tilts applied to those bands, system 300 can reduce differences in the optical signal to noise ratio between various wavelengths within a communication band, and even between multiple communication bands. In a particular embodiment, system 300 can provide substantially flat optical signal to noise ratios between communication bands, where the of those optical signal to noise ratios over the signal wavelengths carried by those bands vary by no more than one decibel.

To reiterate, although the foregoing specific examples have, for clarity purposes, focused on applying lower gains to higher wavelengths and negative gain tilts to at least one band in an effort to counter Raman scattering effects, the general concept equally applies to other embodiments. For example, based on this description, those of ordinary skill in the art will recognize that similar concepts could be applied to counter various other effects of wavelength dependent attenuation. For example, higher gain could be applied to higher wavelengths and positive gain tilt could be applied to one or more bands to counter affects of wavelength dependent attenuation that would otherwise cause additional attenuation in higher band signals.

Although various aspects of the present invention have been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An optical communication system operable to reduce degradation of an optical signal to noise ratio where signals having multiple wavelengths are communicated over a common optical link, the system comprising:

an amplifier assembly operable to introduce to a lower wavelength communication band a first gain and to introduce to a higher wavelength communication band a second gain that comprises a different magnitude than the first gain, the amplifier assembly further operable to introduce at least a first portion of gain tilt into at least one of the lower or higher communication bands, the at least one of the lower or higher communication bands comprising a gain tilt of at least one (1) dB after the introduction of the at least a first portion of gain tilt and alter a final output of the amplifier assembly;

wherein the different magnitude of gain introduced to the higher band and the at least a first portion of the gain tilt introduced into the at least one of the lower or higher communication bands result in a reduction of a degradation of optical signal to noise that could otherwise be caused by wavelength dependent attenuation.

2. The system of claim 1 wherein:
the gain tilt comprises a negative gain tilt wherein shorter signal wavelengths comprise a larger magnitude than longer signal wavelengths; and
wherein the second gain comprises a smaller magnitude than the first gain.

3. The system of claim 1 wherein:
the gain tilt comprises a positive gain tilt wherein shorter signal wavelengths comprise a smaller magnitude than longer signal wavelengths; and
wherein the second gain comprises a larger magnitude than the first gain.

4. The system of claim 1, wherein:
the lower band comprises signal wavelengths from the short communications band (S-Band); and
the higher band comprises signal wavelengths from the conventional communications band (C-Band) or the long communications band (L-Band).

5. The system of claim 1, wherein:
the lower band comprises signal wavelengths from the conventional communications band (C-Band); and
the higher band comprises signal wavelengths from the long communications band (L-Band).

6. The system of claim 1, wherein the amplifier assembly comprises:
a first amplifier assembly operable to introduce the first gain to the lower communication band; and
a second amplifier assembly operable to introduce the second gain to the higher communication band.

7. The system of claim 6, further comprising a controller operable to communicate a control signal to the amplifier assembly to effect a change in the first gain or the second gain or the at least first portion of gain tilt.

8. The system of claim 1, wherein the amplifier assembly comprises a combiner operable to combine the lower communication band comprising the at least a first portion of the gain tilt with the higher communication band comprising the different magnitude of gain.

9. The system of claim 1, wherein the amplifier assembly comprises at least two Raman amplifiers.

10. The system of claim 1, wherein the amplifier assembly comprises at least a parallel combination of optical amplifiers.

11. The system of claim 1, wherein the amplifier assembly comprises at least a serial combination of optical amplifiers.

12. The system of claim 1, wherein the amplifier assembly comprises a gain medium operable to introduce the first gain to the lower communication band and the second gain to the higher communication band.

13. The system of claim 1, wherein the gain tilt comprises at least two (2) dB.

14. The system of claim 1, wherein the amplifier assembly comprises a single output.

15. The system of claim 1, wherein the gain tilt comprises at least three (3) dB.

16. An optical communication system operable to reduce degradation of an optical signal to noise ratio where signals having wavelengths from multiple communication bands are communicated over a common optical link, the system comprising:
an amplifier assembly operable to introduce to a lower wavelength communication band a first gain and at least a first portion of negative gain tilt, the lower communication band comprising a gain tilt of at least one (1) dB after the introduction of the at least a first portion of negative gain tilt and alter a final output of the amplifier assembly, and to introduce to a higher wavelength communication band a second gain that comprises a smaller magnitude than the first gain;

wherein to smaller magnitude of gain introduced to the higher band and the at least first portion of the negative gain tilt introduced into the lower band result in a reduction of a degradation of optical signal to noise ratio in at least the lower band that would otherwise be caused by stimulated Raman scattering when the communication bands are combined and communicated over an optical link.

17. The system of claim 16, wherein:
the lower band comprises signal wavelengths from the short communications band (S-Band); and
the higher band comprises signal wavelengths from the conventional communications band (C-Band) or the long communications band (L-Band).

18. The system of claim 17, wherein the gain tilt comprises at least five (5) dB.

19. The system of claim 16, wherein:
the lower band comprises signal wavelengths from the conventional communications band (C-Band); and
the higher band comprises signal wavelengths from the long communications band (L-Band).

20. The system of claim 16, wherein:
the lower band comprises signal wavelengths from the short communications band (S-Band) and the conventional communications band (C-Band); and
to higher band comprises signal wavelengths from the conventional communications band (C-Band) and the long communications band (L-Band).

21. The system of claim 16, wherein the amplifier assembly comprises:
a first amplifier assembly operable to introduce the first gain and the at least first portion of negative gain tilt to the lower communication band; and
a second amplifier assembly operable to introduce the second gain to the higher communication band.

22. The system of claim 21, wherein the first amplifier assembly comprises a first wavelength pump operating at a first power level; and
wherein the second amplifier assembly comprises a second wavelength pump operating at a second power level operable to result in a second gain that comprises a smaller magnitude than the first gain.

23. The system of claim 21, wherein the second amplifier assembly comprises:
an amplifier; and
an attenuator coupled to the output of the amplifier, the attenuator operable to reduce an effective launch power of the second amplifier assembly compared to a launch power of the first amplifier assembly.

24. The system of claim 21, wherein the first amplifier assembly comprises:
an amplifier operable to amplify the lower band; and
a filter operable to receive the amplified lower band from the amplifier and to filter the lower band to result in a negative gain tilt across the lower band.

25. The system of claim 21, wherein the first amplifier assembly comprises:
a rare earth doped amplifier having at least two amplifying stages; and
a variable optical attenuator disposed between the at least two amplifying stages and operable to modify an inversion level of the first amplifier to introduce a negative gain tilt.

26. The system of claim 16, wherein the amplifier assembly comprises:
a first pump wavelength signal associated with a first wavelength; and
a second pump wavelength signal associated with a second wavelength that is longer than the first wavelength, the second pump wavelength signal having lower power than the first pump wavelength signal;
wherein the first and second pump signal wavelengths are applied to an amplifier of the amplifier assembly to generate an amplifier spectrum having a negative gain tilt.

27. The system of claim 26, wherein the filter resides within the amplifier assembly.

28. The system of claim 16, further comprising preconditioning circuitry coupled between a signal source and the amplifier assembly and operable to introduce a second portion of negative gain tilt into at least the lower band prior to the amplifier assembly receiving the lower band.

29. The system of claim 28, wherein the preconditioning circuitry comprises a filter coupled between the amplifier assembly and a multiplexer operable to receive a first plurality of signal wavelengths and to combine those signals to form the lower band.

30. The system of claim 28, wherein the preconditioning circuitry comprises a plurality of optical attenuator; each operable to receive one of a plurality of signal wavelengths that will be combined to form the lower band, the plurality of attenuators operable to introduce various levels of attenuation to the plurality of signal wavelengths to result in a negative gain tilt across the lower band.

31. The system of claim 28, further comprising a controller operable to communicate a control signal to the preconditioning circuitry to effect a change in the second portion of negative gain flit introduced into the lower band.

32. The system of claim 16, further comprising a controller operable to communicate a control signal to the amplifier assembly to effect a change in the first gain or the at least first portion of negative gain tilt introduced into the lower band.

33. The system of claim 32, wherein the controller comprises a monitoring element operable to monitor at least one characteristic of the system and to generate the control signal in response to a change in the at least one characteristic.

34. The system of claim 16, wherein the amplifier assembly comprises a combiner operable to combine the lower communication band comprising the at least a first portion of the negative gain tilt with the higher communication band comprising the smaller magnitude of gain.

35. The system of claim 16, wherein the amplifier assembly comprises a gain medium operable to introduce the first gain to the lower communication band and the second gain to the higher communication band.

36. The system of claim 16, wherein the gain tilt comprises at least two (2) dB.

37. The system of claim 16, wherein the negative gain tilt comprises at least three (3) dB.

38. A method of reducing degradation of an optical signal to noise ratio where multiple communication bands are communicated over a common optical link, the method comprising:
introducing a first gain into a lower communication band comprising a first plurality of signal wavelengths;
introducing a second gain that comprises a smaller magnitude than the first gain into a higher communication band comprising a second plurality of signal wavelengths having longer wavelengths than the first plurality of signal wavelengths; and
introducing into at least the lower communication band at least a first portion of negative gain tilt, the lower communication band comprising a gain tilt of at least one (1) dB after the introduction of the at least a first portion of negative gain tilt and alter a final output of the amplifier assembly;
wherein the smaller magnitude of gain introduced to the higher band and the negative gain tilt introduced into at least the lower band result in a reduction of a degradation of optical signal to noise ratio in at least the lower band that would otherwise be caused by stimulated Raman scattering when the communication bands are combined and communicated over an optical link.

39. The method of claim 38 wherein the lower band comprises signal wavelengths from the short communications band (S-Band), and the higher band comprises signal wavelengths from the conventional communications band (C-Band) or the long communications band (L-Band).

40. The method of claim 38, wherein:
the lower band comprises signal wavelengths from the short communications band (S-Band) and the conventional communications band (C-Band); and
the higher band comprises signal wavelengths from the conventional communications band (C-Band) and the long communications band (L-Band).

41. The method of claim 38 wherein the lower band comprises signal wavelengths from the conventional communications band (C-Band), and the higher band comprises signal wavelengths from the long communications band CL-Band).

42. The method of claim 38, wherein introducing a first gain into the lower communication band and introducing a second gain that comprises a smaller magnitude than the first gain into the higher communication band comprises:
introducing the first gain to the lower communication band using a first amplifier assembly; and
introducing the second gain to the higher communication band using a second amplifier assembly.

43. The method of claim 42, wherein introducing a first gain into the lower band and introducing a second gain smaller than the first gain into to higher band comprise:
driving the first amplifier assembly with a first wavelength pump operating at a first power level; and
driving the second amplifier assembly with a second wavelength pump operating at a second power level that is smaller than the first power level to result in a smaller gain being introduced at the second amplifier assembly.

44. The method of claim 42, wherein introducing a first gain into the lower band and introducing a second gain smaller than the first gain into the higher band comprise:
  applying approximately equal gains to each band; and
  attenuating the higher band to reduce an effective launch power of the second amplifier assembly compared to the launch power of the first amplifier assembly.

45. The method of claim 42, wherein introducing at least a first portion of negative gain tilt into at least the lower band comprises passing the lower band through a filter operable to attenuate longer signal wavelengths more than shorter signal wavelengths.

46. The method of claim 45, wherein the filter resides within the first amplifier assembly.

47. The method of claim 42, wherein introducing at least a first portion of negative gain tilt into at least the lower band comprises coupling a variable optical attenuator between amplifying stages of the first amplifier assembly comprising a rare-earth doped amplifier to modify an inversion level of the amplifier assembly to introduce a negative gain tilt.

48. The method of claim 42, wherein introducing at least a first portion of negative gain tilt into at least the lower band comprises:
  applying to the first amplifier assembly a plurality of pump wavelength signals having different power levels, wherein the plurality of pump signal wavelengths are applied to an amplifier of the amplifier assembly to generate an amplifier spectrum having a negative gain tilt.

49. The method of claim 38, further comprising preconditioning the lower band to introduce a second portion of negative gain tilt into the lower band prior to introducing the first gain and the at least first portion of negative gain tilt to the lower band.

50. The method of claim 49, wherein preconditioning the lower band to introduce a second portion of negative gain tilt comprises passing the lower band through a filter operable to attenuate longer signal wavelengths more than shorter signal wavelengths.

51. The method of claim 49, wherein preconditioning the lower band to introduce a second portion of negative gain tilt comprises passing each of the first plurality of signal wavelengths through one of a plurality of optical attenuators, each operable to introduce one of a plurality of levels of attenuation to the wavelength signal received to result in a negative gain tilt across the lower band.

52. The method of claim 49, further comprising communicating a control signal to a device operable to introduce the second portion of negative gain tilt to effect a change in the second portion of negative gain tilt introduced into the lower band.

53. The method of claim 38, further comprising communicating a control signal to a device operable to introduce the first gain, the second gain, or the first portion of negative gain tilt to effect a change in the first gain, the second gain, or the first portion of negative gain tilt introduced into the lower band.

54. The method of claim 53, further comprising:
  monitoring at least one characteristic of a communication system; and
  generating the control signal in response to a change in the at least one characteristic.

55. The method of claim 38, wherein the negative gain tilt comprises at least three (3) dB.

56. A method of reducing degradation of an, optical signal to noise ratio where multiple communication bands are communicated over a common optical link, the method comprising:
  introducing a first gain into a lower communication band comprising a first plurality of signal wavelengths;
  introducing a second gain that comprises a smaller magnitude than the first gain into a higher communication band comprising a second plurality of signal wavelengths comprising longer wavelengths than the first plurality of signal wavelengths;
  introducing a negative gain tilt into at least the lower communication band;
  coupling the lower communication band comprising the negative gain tilt and higher communication band comprising the smaller magnitude of gain into a combined signal; and
  communicating the combined signal over an optical communication link;
  wherein the lower communication band comprises a gain tilt of at least one (1) dB after the introduction of the negative gain tilt and after a final output of the amplifier assembly;
  wherein the negative gain tilt introduced into the lower band and the smaller magnitude of the second gain compared to the first gain result in a reduction of degradation of optical signal to noise ratio that would otherwise be caused by stimulated Raman scattering.

57. The method of claim 56, wherein introducing a negative gain tilt into at least one communication band comprises introducing negative gain tilt at an amplifier assembly receiving the communication band.

58. The method of claim 56, wherein introducing a negative gain tilt into at least one communication band comprises:
  introducing a first portion of negative gain tilt at an amplifier assembly receiving the communication band; and
  introducing a second portion of negative gain tilt at preconditioning circuitry coupled between an optical source and the amplifier assembly introducing the first portion of negative gain tilt.

59. The method of claim 56, wherein the gain tilt comprises at least three (3) dB.

60. A optical communication system operable to reduce degradation of an optical signal to noise ratio, the system comprising:
  a first amplifier assembly comprising at least one gain medium, the at least one gain medium operable to receive a preconditioned lower communication band comprising a first plurality of signal wavelengths having a substantially negative gain tilt as a function of signal wavelengths, the first amplifier assembly operable to introduce a first gain to the first plurality of signal wavelengths, wherein the first plurality of wavelengths comprise a gain tilt of at least one (1) dB after a final output of the first amplifier assembly; and
  a second amplifier assembly operable to introduce into a higher communication band a second gain that comprises a smaller magnitude than the first gain, the higher band comprising a second plurality of signal wavelengths having wavelengths longer than the first plurality of signal wavelengths;
  wherein the smaller magnitude of gain introduced to the higher band and the preconditioning of at least the lower band result in a reduction of a degradation of optical signal to noise ratio in at least the lower band that would otherwise be caused by stimulated Raman scattering when the communication bands are combined and communicated over an optical link.

61. The system of claim 60, wherein the gain tilt comprises at least three (3) dB.

62. A method of reducing degradation of an optical signal to noise ratio in a communication system, the method comprising:

receiving a preconditioned lower communication band comprising a first plurality of signal wavelengths having at least a portion of a substantially negative gain flit as a function of signal wavelengths at a gain medium of an amplifier assembly;

receiving a higher communication band comprising a second plurality of signal wavelengths having longer wavelengths than the first plurality of signal wavelengths;

introducing a first gain into the lower communication band; and introducing a second gain that comprises a smaller magnitude than the first gain into the higher communication band;

wherein the smaller magnitude of gain introduced to the higher band and the preconditioning of at least the lower band result in a reduction of a degradation of optical signal to noise ratio in at least the lower band that would otherwise be caused by stimulated Raman scattering when the communication bands are combined and communicated over an optical link and wherein the first plurality of wavelengths comprise a gain tilt of at least one (1) dB after a final output of the first amplifier assembly.

63. The method of claim 62, wherein the gain tilt comprises at least three (3) dB.

64. An optical communication system operable to reduce differences between optical signal to noise ratios associated with multiple communication bands communicated ova a common optical link, the system comprising:

an amplifier assembly operable to introduce to a lower communication band a first gain and at least a first portion of a first negative gain tilt, and to introduce to a higher communication band a second gain that comprises a smaller magnitude than the first gain and at least a first portion of a second negative gain tilt;

wherein each of the lower and higher communication bands comprise a gain tilt of at least one (1) dB after the introduction of the first negative gain tilt and the second negative gain tilt, and after a final output of the amplifier assembly;

wherein the smaller gain introduced to the higher band and the negative gain tilts introduced into the higher and lower bands result in a reduced difference between optical signal to noise ratios associated the lower and higher bands after those bands are combined and communicated over a common optical link.

65. The system of claim 64, wherein:

the lower band comprises signal wavelengths from the short communications band (S-Band); and the higher band comprises signal wavelengths from the conventional communications band (C-Band) or the long communications band (L-Band).

66. The system of claim 64, wherein:

the lower band comprises signal wavelengths from the conventional communications band (C-Band); and the higher band comprises signal wavelengths from the long communications band (L-Band).

67. The system of claim 64, wherein the amplifier assembly comprises:

a first amplifier assembly operable to introduce the first gain and the negative gain tilt to the lower communication band; and a second amplifier assembly operable to introduce the second gain to the higher communication band.

68. The system of claim 65, wherein the amplifier assembly further includes a third amplifier assembly operable to introduce a third gain, which is smaller than the first gain and larger than the second gain, and to introduce at least a first portion of a third negative gain tilt into a middle communication band.

69. The system of claim 68, wherein the lower band comprises signal wavelengths from the short communications band (S-Band), the middle band comprises signal wavelengths from the conventional communications band (C-Band), and the higher band comprises signal wavelengths from the long communications band (L-Band).

70. The system of claim 68, wherein the negative gain tilt applied to the middle band is different than the negative gain tilt applied to the higher band.

71. The system of claim 65, wherein the ratio between optical signal to noise ratios associated with the lower and higher bands comprises no more than three decibels.

72. The system of claim 65, wherein the ratio between optical signal to noise ratios associated with the lower and higher bands comprises no more than one decibel.

73. The system of claim 65, further comprising preconditioning circuitry coupled between a signal source and the amplifier assembly and operable to introduce a second portion of negative gain tilt into the lower band prior to the amplifier assembly receiving the lower band.

74. The system of claim 73, wherein the preconditioning circuitry operates to introduce a first preconditioning negative gain tilt into the lower band and a second preconditioning negative gain tilt into the higher band.

75. The system of claim 73, further comprising a controller operable to communicate one or more control signals to preconditioning circuitry to effect a change in the negative gain tilt introduced into the lower band.

76. The system of claim 65, further comprising a controller operable to communicate one or more control signals to the amplifier assembly to effect a change in the first gain or the negative gain tilt introduced into the lower band.

77. The system of claim 76, wherein the controller comprises a monitoring element operable to monitor at least one characteristic of the system and to generate the control signals in response to a change in the at least one characteristic.

78. The system of claim 64, wherein the amplifier assembly comprises a combiner operable to combine the lower communication band comprising the at least a first portion of the first negative gain tilt with the higher communication band comprising the smaller magnitude of gain and the at least a first portion of the second negative gain tilt.

79. The system of claim 64, wherein the gain tilt comprises at least three (3) dB.

80. A method of reducing differences between optical signal to noise ratios associated with multiple communication bands communicated over a common optical link, the method comprising:

introducing a first gain into a lower communication band;

introducing a second gain that comprises a smaller magnitude than the first gain into a higher communication band;

introducing a first negative gain tilt into the lower communication band; and introducing a second negative gain tilt into the higher communication band;

wherein each of the lower and higher communication bands comprise a gain tilt of at least one (1) dB after the introduction of the first negative gain tilt and the second negative gain tilt, and alter a final output of the amplifier assembly;

wherein the smaller gain introduced to the higher band and the negative gain tilts introduced into the higher and lower bands result in a reduced discrepancy between optical signal to noise ratios associated with the lower and higher bands after those bands are combined and communicated over a common optical link.

81. The method of claim 80 wherein the lower band comprises signal wavelengths from the short communications band (S-Band), and the higher band comprises signal wavelengths from the conventional communications band (C-Band) or the long communications band (L-B and).

82. The method of claim 80 wherein the lower band comprises signal wavelengths from the conventional communications band (C-Band), and the higher band comprises signal wavelengths from the long communications band (L-Band).

83. The method of claim 80, wherein introducing a first gain and first negative gain tilt into the lower communication band and introducing a second gain and a second negative gain tilt into the higher communication band comprises:

introducing the first gain and first negative gain tilt to the lower communication band using a first amplifier assembly; and introducing the second gain and the second negative gain tilt to the higher communication band using a second amplifier assembly.

84. The method of claim 80, further comprising introducing a third gain into a middle communications band, the third gain being larger than the first gain applied to the lower band and smaller than the second gain applied to the higher band.

85. The method of claim 84, wherein the lower band comprises signal wavelengths from the short communications band (S-Band), the middle band comprises signal wavelengths from the conventional communications band (C-Band), and the higher band comprises signal wavelengths from the long communications band (L-band).

86. The method of claim 80, further comprising applying a third negative gain to a middle communications band.

87. The method of claim 70, wherein the third negative gain tilt applied to the middle band is different than the second negative gain tilt applied to the higher band.

88. The method of claim 80, wherein the ratio between each of the optical signal to noise ratios associated with the lower and higher bands composes no more than three decibels.

89. The method of claim 80, wherein the ratio between the optical signal to noise ratios associated with the lower and higher bands comprises no more than one decibel.

90. The method of claim 80, further comprising preconditioning the lower band to introduce a preconditioned negative gain tilt into the lower band prior to introducing the first gain to the lower band.

91. The method of claim 80, further comprising communicating one or more control signals to a device or devices operable to introduce one of the gains or the negative gain tilts, and to effect a change in one or more of the gains or gain tilts, the change operable to substantially maintain optical signal to noise ratios of the lower and higher bands.

92. The method of claim 91, further comprising:
monitoring at least one characteristic of a communication system; and
generating the control signals in response to a change in the at least one characteristic.

93. The method of claim 80, wherein the gain tilt comprises at least three (3) dB.

94. A system operable to reduce differences between optical signal to noise ratios associated with multiple communication bands communicated over a common optical link, the system comprising:

a first amplifier assembly comprising at least one gain medium, the at least one gain medium operable to receive a preconditioned lower communication band comprising a first plurality of signal wavelengths having a first substantially negative gain tilt as a function of wavelength, the first amplifier assembly operable to introduce a first gain to the first plurality of signal wavelengths, wherein the first plurality of wavelengths comprise a gain tilt of at least one dB after a final output of the first amplifier assembly; and a second amplifier assembly operable to introduce into a preconditioned higher communication band a second gain that comprises a smaller magnitude than the first gain, the preconditioned higher band comprising a second plurality of signal wavelengths having wavelengths longer than the first plurality of signal wavelengths and having a second negative gain tilt;

wherein the smaller magnitude of gain introduced to the higher band and the preconditioning of the higher and lower bands result in an approximately flat optical signal to noise ratio across the lower and higher bands alter those bands are combined and communicated over an optical link.

95. The system of claim 94, wherein the gain tilt comprises at least three (3) dB.

96. A method of reducing degradation of an optical signal to noise ratio in a communication system, the method comprising:

receiving a preconditioned lower communication band comprising a first plurality of signal wavelengths having a first substantially negative gain tilt as a function of wavelength at a gain medium of an amplifier assembly;

receiving a preconditioned higher communication band comprising a second plurality of signal wavelengths having longer wavelengths than the first plurality of signal wavelengths and a second negative gain tilt;

introducing a first gain into the lower communication band; and introducing a second gain that comprises a smaller magnitude than the first gain into the higher communication band;

wherein the smaller magnitude of gain introduced to the higher band and the preconditioning of the higher and lower bands result in an approximately flat optical signal to noise ratio across the lower and higher bands after those bands are combined and communicated over an optical link and wherein the first plurality of wavelengths comprise a gain tilt of at least one (1) dB after a final output of the first amplifier assembly.

97. The method of claim 76, wherein the gain tilt comprises at least three (3) dB.

98. A system operable to maintain a substantially flat optical signal to noise ratio between multiple communication bands communicated over a common optical link, comprising:

an amplifier assembly operable to apply a first gain and a first negative gain tilt to a lower communication band, and to apply a second gain and a second negative gain tilt to a higher communication band, the second gain comprising a smaller magnitude than the first gain, the lower communication band comprising a gain tilt of at least one (1) dB after the introduction of the first negative gain tilt and after a final output of the amplifier assembly;

wherein the optical signal to noise ratios of the lower band and the higher band, after being combined and communicated over a common optical link, differ by no more than three decibels.

99. The system of claim 98, wherein the gain tilt comprises at least three (3) dB.

100. A system operable to maintain a substantially flat optical signal to noise ratio between multiple communication bands communicated over a common optical link, comprising:

an amplifier assembly operable to apply a first gain and a first negative gain tilt to a lower communication band output from the amplifier assembly, and to apply a second gain and a second negative gain tilt to a higher communication band output from the amplifier assembly, the second gain comprising a smaller magnitude than the first gain, the lower communication band comprising a gain tilt of at least one (1) dB after the introduction of the first negative gain tilt and alter a final output of the amplifier assembly;

wherein the spectra of the lower band and the upper band exhibit a power tilt wherein at least some shorter signal wavelengths within each band comprise greater magnitudes than at least some longer signal wavelengths within each band.

101. The system of claim 100, the amplifier assembly comprises a combiner operable to combine the lower communication band comprising the at least a first portion of the first negative gain tilt with the higher communication band comprising the smaller magnitude of gain and the at least a first portion of the second negative gain tilt.

102. The system of claim 100, wherein the gain tilt comprises at least three (3) dB.

103. An optical communication system operable to reduce degradation of an optical signal to noise ratio where signals having wavelengths from multiple communication bands are communicated over a common optical link having a plurality of fiber spans, the system comprising:

a plurality of in-line amplifier assemblies each coupled between a different pair of the plurality of fiber spans, at least one of the in-line amplifier assemblies operable to introduce to a lower communication band a first gain and a negative gain tilt, the lower communication band comprising a gain tilt of at least one (1) dB after the introduction of the negative gain tilt and after a final output of the at least one in-line amplifier assembly, and to introduce to a higher communication band a second gain that comprises a smaller magnitude than the first gain;

wherein the smaller magnitude of gain introduced to the higher band and the negative gain tilt introduced into the lower band result in a reduction of a degradation of optical signal to noise ratio in at least to lower band that would otherwise be caused by stimulated Raman scattering when the communication bands are combined and communicated over an optical link.

104. The system of claim 103, the amplifier assembly comprises a combiner operable to combine the lower communication band comprising the at least a first portion of the first negative gain tilt with the higher communication band comprising the smaller magnitude of gain and the at least a first portion of the second negative gain tilt.

105. The system of claim 103, wherein the negative gain tilt comprises at least three (3) dB.

106. An optical communication system operable to reduce degradation of an optical signal to noise ratio where a signal having wavelengths from multiple communication bands is communicated over a common optical link, having a plurality of fiber spans, the system comprising:

a booster amplifier assembly coupled to a first fiber span of to optical link;

a preamplifier coupled to a last fiber span of the optical link; and an in-line amplifier coupled between the booster amplifier and the preamplifier;

wherein at least one of the booster amplifier, preamplifier and in-line amplifiers comprises:

an amplifier assembly operable to introduce a first gain and at least a first portion of negative gain tilt into a lower wavelength communication band output from the amplifier assembly, and to introduce to a higher wavelength communication band a second gain that comprises a smaller magnitude than the first gain, the lower communication band comprising a gain tilt of at least one (1) dB after the introduction of the at least a first portion of negative gain tilt and after a final output of the amplifier assembly;

wherein the smaller magnitude of gain introduced to the higher band and the at least the first portion of negative gain tilt introduced into the lower band result in a reduction of a degradation of optical signal to noise ratio in at least the lower band that would otherwise be caused by stimulated Raman scattering when the communication bands are combined and communicated over an optical link.

107. The system of claim 106, the amplifier assembly comprises a combiner operable to combine the lower communication band comprising the at least a first portion of the first negative gain tilt with the higher communication band comprising the smaller magnitude of gain.

108. The system of claim 106, wherein the gain tilt comprises at least three (3) dB.

109. The method of claim 38, further comprising combining the lower communication band comprising the at least a first portion of the negative gain tilt with the higher communication band comprising the smaller magnitude of gain.

* * * * *